(12) United States Patent
Julian

(10) Patent No.: US 8,937,591 B2
(45) Date of Patent: Jan. 20, 2015

(54) SYSTEMS AND METHODS FOR COUNTERACTING A PERCEPTUAL FADING OF A MOVABLE INDICATOR

(75) Inventor: David P. Julian, Cupertino, CA (US)

(73) Assignee: Apple Inc., Cupertino, CA (US)

(*) Notice: Subject to any disclaimer, the term of this patent is extended or adjusted under 35 U.S.C. 154(b) by 167 days.

(21) Appl. No.: 13/441,654

(22) Filed: Apr. 6, 2012

(65) Prior Publication Data

US 2013/0265227 A1   Oct. 10, 2013

(51) Int. Cl.
*G06F 3/033* (2013.01)

(52) U.S. Cl.
USPC ............ 345/157; 345/156; 345/158; 351/203; 351/224; 348/333.01; 715/856; 715/861

(58) Field of Classification Search
CPC .............. G06F 3/00; A61B 3/00; A61B 3/02; G09G 3/02; G09G 5/08; H04N 5/222; G09K 9/00
USPC ................... 345/156, 158, 326; 351/203, 224; 348/333.01; 715/856–861
See application file for complete search history.

(56) References Cited

U.S. PATENT DOCUMENTS

| | | | |
|---|---|---|---|
| 4,479,784 A | 10/1984 | Mallinson et al. | |
| 4,995,717 A * | 2/1991 | Damato | 351/224 |
| 5,455,601 A * | 10/1995 | Ozaki | 345/156 |
| 6,028,608 A | 2/2000 | Jenkins | |
| 6,075,525 A * | 6/2000 | Hsieh | 345/589 |
| 6,417,867 B1 | 7/2002 | Hallberg | |
| 6,533,417 B1 * | 3/2003 | Sain | 351/203 |
| 7,365,738 B2 | 4/2008 | Molander et al. | |
| 2006/0109242 A1 | 5/2006 | Simpkins | |
| 2008/0117323 A1 * | 5/2008 | Sakamoto et al. | 348/333.01 |
| 2008/0211766 A1 | 9/2008 | Westerman et al. | |
| 2010/0201621 A1 * | 8/2010 | Niikawa | 345/158 |
| 2010/0207877 A1 | 8/2010 | Woodard | |
| 2012/0036433 A1 | 2/2012 | Zimmer et al. | |
| 2012/0075432 A1 | 3/2012 | Bilbrey et al. | |
| 2012/0121178 A1 | 5/2012 | Finlayson | |
| 2013/0028443 A1 | 1/2013 | Pance et al. | |
| 2013/0135198 A1 | 5/2013 | Hodge et al. | |

FOREIGN PATENT DOCUMENTS

WO   WO 2010/142455 A2   12/2010

OTHER PUBLICATIONS

Porta et al., "ceCursor, a Contextual Eye Cursor for General Pointing in Windows Environments," *Proceedings of the 2010 Symposium on Eye-Tracking Research and Applications*, 331-337, Mar. 22-24, (2010).
Matsumoto et al., "Evaluation of Gaze-Added Target Selection Methods Suitable for General GUIs," *Int. J. Computer Applications in Technology*, 24:(1)17-24 (2005).
Bonneh, et al., "Motion Induced Blindness," http://www.scholarpedia.org/article/Motion_induced_blindness, downloaded Mar. 15, 2014, 9 pages.

* cited by examiner

*Primary Examiner* — Lun-Yi Lao
*Assistant Examiner* — Johny Lau
(74) *Attorney, Agent, or Firm* — Morgan, Lewis & Bockius LLP

(57) ABSTRACT

Systems and methods are provided for altering the position or visual appearance of a movable indicator in a GUI that is controlled by eye tracking to counteract a perceptual fading of the movable indicator with respect to the GUI. The position of the user's point of gaze may be tracked, the movable indicator may be rendering at a position associated with the user's point of gaze, and the position or visual appearance of the movable indicator may be altered when an event, such as a passage of time or a blinking of the user's eyes, is detected.

28 Claims, 11 Drawing Sheets

SYSTEMS AND METHODS FOR COUNTERACTING A PERCEPTUAL FADING OF A MOVABLE INDICATOR

FIELD

This application relates to enhancing the visibility of a movable indicator in a graphical user interface (GUI) and, more particularly, to altering the position, appearance, or both of a movable indicator so as to counteract a perceptual fading of the movable indicator with respect to the GUI.

BACKGROUND

Troxler fading is a phenomenon of visual perception that the human brain uses to cope with blind spots on the retina, which is the light-sensitive tissue lining of the inner surface of the eye. One result of this phenomenon is that when one fixates on a particular point, objects in one's peripheral vision will fade away and disappear. Another result related to this phenomenon is the perceived fading of a fixated stimulus when its retinal image is made stationary on the retina, which is otherwise known as a stabilized retinal image. This perceived fading causes the stimulus to fade away after a short time and effectively disappear to the viewer (i.e., the person whose retina is capturing and perceiving the fixed stimulus).

The perceptual fading of stabilized retinal images presents a particularly difficult problem with respect to the navigation of a GUI using a movable indicator whose position is controlled by eye tracking. When eye tracking is accurate such that the movable indicator consistently appears wherever the user looks in the GUI, the movable indicator will be stationary with respect to the user's retina, and as such the movable indicator may fade with respect to the user's perception of the GUI. The perceptual fading of the movable indicator may cause the user to lose track of the location of the movable indicator within the GUI, which lessens the usability of the GUI itself.

When a user loses track of a movable indicator within a GUI, systems typically depend on the user to provide manual input to the GUI in order to remind the user of the location of the movable indicator. However, this is undesirable as it causes the user to become distracted from whatever interaction they are trying to accomplish with the GUI in the first place. Further, such systems do not take into account when the perceptual fading of the movable indicator occurs, and how it can be prevented such that the user does not notice or consider the prevention measure to be a nuisance (e.g., by blocking other information within the GUI or becoming a distraction).

SUMMARY

This application, in various implementations, provides systems, methods, and devices that provide a user of a GUI with one or more measures to counteract a perceptual fading of a movable indicator with respect to the GUI.

In one aspect, a user's point of gaze on a display of a GUI is tracked based on input received from an eye tracking apparatus. The system may render a movable indicator at a position associated with the user's point of gaze within the GUI. The system may detect a passage of time or a blinking of the user's eye. In response to detecting one or both of these events, the position of the movable indicator is altered so as to counteract a perceptual fading of the movable indicator with respect to the GUI. This perceptual fading may occur because the user's fixation on the movable indicator causes the movable indicator to be a stabilized retinal image with respect to the user of the GUI. Altering the position of the movable indicator may restore the user's perception of the movable indicator such that it is no longer affected by the perceptual fading.

In one configuration, the passage of time may be detected by initializing a timer based on a received indication of a period of time. The received indication may be generated based on user input, or may be predetermined by the system. The position of the movable indicator may be altered each instance of the timer elapsing the period of time. In this manner, the location of the movable indictable is periodically altered to counteract the perceptual fading of the movable indicator with respect to the GUI.

In one configuration, the blinking of a user's eye may be detected through the detection of infrared signals. The system may transmit infrared signals from an infrared transmitter. Reflections of the infrared signals may be received. The reflections of the infrared signals may be analyzed for a presence and subsequent absence of an exposed pupil. In another aspect the blinking of a user's eye may be detected using a sequence of images of a user's face. This sequence of images may be analyzed for a presence and subsequent absence of facial features of the user. The facial features may include a pupil, a pigment in the eye, or an eyelid of the user. The presence and subsequent absence of the exposed pupil or facial feature may indicate that the user has opened and closed their eyelids, which signify the blinking of the user's eyes. In one configuration, the position of the movable indicator may be altered by rendering the movable indicator at a position in the GUI different from the position associated with the user's point of gaze within the GUI during the detected blinking of the user's eye. In this manner, the position of the movable indicator is altered to counteract its perceptual fading such that the user is not distracted.

In one configuration, positions in the GUI may be defined that are different from the user's point of gaze within the GUI. The position of the movable indicator may be altered by rendering the movable indicator at one of the defined positions upon detecting the passage of time or the blinking of a user's eye. In one configuration, the different positions may be defined by setting a boundary located a predefined amount of pixels around the position associated with the user's point of gaze within the GUI. The different positions may be defined as one or more pixels on within the boundary. These positions may be selected randomly, or based on a predetermined pattern. Further, a repeating pattern may be defined consisting of the different positions. The movable indicator may be rendered at one of the positions in the repeating pattern upon each instance of detecting the passage of time or the blinking of the user's eye.

In one configuration, altering the position of the movable indicator may include providing a command to an input device driver that prompts the GUI to render the movable indicator at a position in the GUI different from the position associated with the user's point of gaze within the GUI. In this manner, data from an input device to the input device driver may be preempted such that the measure for counteracting the perceptual fading of the movable indicator is implemented without action on behalf of the user.

In one configuration, one or more characteristics of the viewing position of the user with respect to the display of the GUI are monitored. The monitored characteristics may be determined to be consistent or inconsistent over time. The position of the movable indicator is altered based at least in part on this determination so as to counteract a perceptual fading of the movable indicator with respect to the GUI. In particular, if one or more characteristics are consistent, the movable indicator may be rendered in a position different from the position associated with the user's point of gaze within the GUI upon the passage of time or the blinking of the user's eye. However, if one or more characteristics are not consistent, the position of the movable indicator will be allowed to remain consistent with the position associated with the user's point of gaze within the GUI.

In one aspect, the monitored characteristic may be the user's viewing angle of the display of the GUI. An initial and subsequent user viewing angles are determined, and it is determined whether the subsequent user viewing angles of the display of the GUI fall within a range calibrated around the initial user viewing angle of the display of the GUI. In another aspect, the monitored characteristic may be a user's viewing distance from the display of the GUI. Infrared signals are transmitted from an infrared transmitter on the display of the GUI, and reflections of the infrared signals are received. Based on the received reflections, it is determined whether a user's viewing distances from the display of the GUI are within a predetermined range.

Various advantages and applications for using systems, methods, and devices that provide one or more measures to counteract a perceptual fading of a movable indicator with respect to the GUI are discussed in more detail below.

BRIEF DESCRIPTION OF THE DRAWINGS

The above and other features of the present application, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

This application, in various implementations, provides systems, methods, and devices that provide a user of a GUI with one or more measures to counteract a perceptual fading of a movable indicator with respect to the GUI. The GUI may exist as part of an interactive operating system environment such as a Microsoft Windows-based operating system, Mac OS X based operating system, Linux based operating system, or other suitable operating systems with a GUI. The movable indicator may be any object that the user manipulates in order to navigate or interact with the GUI, such as a mouse cursor, bi-directional text cursor, a movable object within a game, or any other object within the GUI.

In certain configurations, the GUI may be presented by and controlled with an eye tracking system. The eye tracking system may allow a user of the GUI to navigate or interact with various elements in the GUI, such as a word processor, game, web browser, or any other suitable interactive application, simply by gazing or looking at a particular point on a display of the GUI. For example, the user may gaze at a button on the menu bar of a word processing application, causing the eye tracking system to render a cursor over the button. In certain configurations, the user of the eye tracking system may be able to select the button using any suitable input device external to the display device that is presenting the GUI, such as a track pad or mouse. In other configurations, the user of the eye tracking system may be able to select the button using an input device built-in to the display device presenting the GUI itself, such as a capacitive or resistive touch screen. In yet other configurations, the user of the eye tracking system may be able to select the button using facial gestures or voice input.

In certain configurations, the eye tracking system may persistently render the movable indicator wherever the user looks in the GUI. This rendering of the movable indicator may be accurate to the degree that the movable indicator becomes a stabilized retinal image with respect to the user's eyes. As such, the movable indicator may fade with respect to the user's perception of the GUI. In other words, the movable indicator may no longer be visible to the user. In such situations, it is desirable to restore the user's perception of the movable indicator to counteract this fading effect. Accordingly, the eye tracking system described herein may automatically alter the position, appearance, or both of the movable indicator so that it is no longer a stabilized retinal image and can be perceived by the user.

Figure 1A:
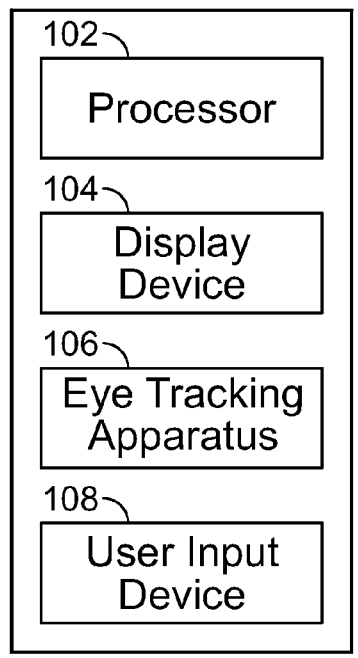
FIG. 1A is a diagram including components of an eye tracking system.

FIG. 1A is a diagram including components of an eye tracking system 100A. The system 100A includes a processor 102, display device 104, eye tracking apparatus 106, and user input device 108. The processor 102 may include one or more processors arranged to process data, functions, and/or applications of eye tracking system 100A. In certain implementations, the processing performed by processor 102 provides a GUI that can be interacted with or controlled by a user's gaze at the GUI. In addition, the processing performed by processor 102 may control the position of a movable indicator within the GUI based on the user's gaze. Further, the processing performed by processor 102 may detect various events, such as the passage of time, the blinking of a user's eye, and changes in the viewing position of the user with respect to a display of the GUI. When these events are detected, the processing performed by processor 102 may determine whether to alter the position, visual appearance, or both of the movable indicator in order to counteract or prevent the movable indicator from fading according to the vantage point of the user. Processor 102 may drive a display of display device 104, and may retrieve inputs from eye tracking apparatus 106 and user input device 108. In certain configurations, processor 102 may include one or more central processing units (CPUs) within one or more devices, desktop computers, laptop computers, tablet computers, servers, portable music players, or any suitable computing form factor.

Display device 104 may include hardware, software, or a combination therefore arranged to render a GUI. In certain configurations, display device 104 may include one or more LCD displays, CRT displays, projector displays, graphics processing units, or any suitable display or projection technology. Eye tracking apparatus 106 may include hardware, software, or a combination therefore arranged to track a user's point of gaze at a GUI displayed by display device 104. The position associated with the user's point of gaze may be associated with a particular pixel on display device 104, such as a pixel associated with the tip of a rendered bitmap representing a movable indicator in a GUI rendered by display device 104. In certain configurations, eye tracking apparatus 106 may communicate the position of the user's point of gaze to processor 102, display device 104, or both, in order to change the position of a movable indicator within a GUI displayed on display device 104 such that the movable indicator tracks the user's point of gaze. This tracking may be real-time such that the movable indicator is persistently displayed at a position in the GUI associated with the user's point of gaze. In certain configurations, the display of this tracking may be fluid in that the movable indicator trails the user's point of gaze and can be perceived as gliding from various positions within the GUI. In other configurations, this tracking may be granular in that the movable indicator jumps from position to position within the GUI associated with the user's point of gaze at a particular time. In certain configurations, eye tracking apparatus 106 may include hardware, such as cameras or infrared transmitters and receivers, which are integrated into display device 104 itself. In other configurations, eye tracking apparatus 106 may include hardware that is free standing from display device 104, such as a headset or web camera.

User input device 108 may include hardware, software, or a combination therefore arranged to provide an interface for one or more users to control or interact with the GUI rendered on display device 104 apart from any control or interaction with the GUI provided by eye tracking apparatus 106. User input device 108 may include a user input device that can take a variety of forms, such as a button, keypad, dial, trackpad, a click wheel, microphone, and/or a touch screen. For example, user input device 108 may be a trackpad that allows the user to select or interact with an object in a GUI that is rendered underneath a movable indicator whose position is controlled by eye tracking apparatus 106. In certain configurations, user input device 108 may not allow a user to control the position of the movable indicator itself within the GUI. In other configurations, user input device 108 may allow a user to control the position of the movable indicator within a GUI to provide, for example, a correction or modification of the position of the movable indicator from the position associated with the user's point of gaze within the GUI.

Figure 1B:
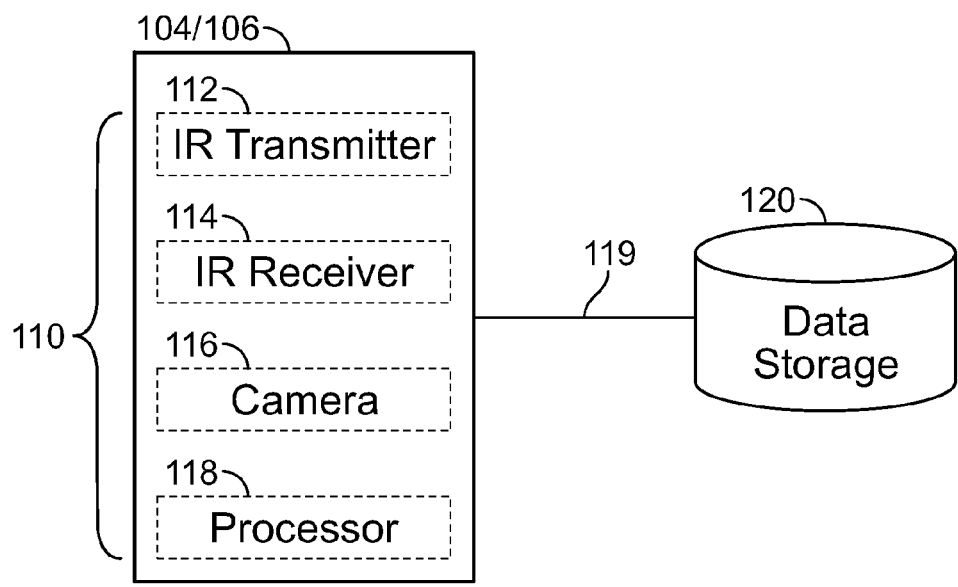
FIG. 1B is an diagram including components associated with a display device or eye tracking apparatus within the eye tracking system.

FIG. 1B is an diagram including components 110 associated with a display device or eye tracking apparatus 110B of eye tracking system 100A (FIG. 1A). In certain configurations, display device or eye tracking apparatus 110B may be display device 104, eye tracking apparatus 106 (FIG. 1A), or both. Components 110 may include IR transmitter 112, IR receiver 114, camera 116, and processor 118. Further, display device or eye tracking apparatus 100B may be in communication with data storage 120 through data link 119. IR transmitter 112 may include hardware, software, or a combination therefore arranged to generate and transmit infrared or near-infrared signals from display device or eye tracking apparatus 110B towards an object of interest such as a user's face, or more particularly, a user's eyes. In certain configurations, reflections of these infrared or near-infrared signals may be used to detect proximity of the object of interest. In other configurations, reflections of these infrared or near-infrared signals may be used to detect the presence or absence of a feature of a user's eyes, such as the presence or absence of an exposed pupil. The hardware may include one or more infrared LEDs, as well as any circuitry suitable to cause the infrared LEDs to transmit infrared or near-infrared signals.

IR receiver 114 may include hardware, software, or a combination therefore arranged to capture images from the infrared spectrum, detect infrared signals, or both. IR receiver 114 may be configured with hardware to capture images from the infrared spectrum using one or more infrared filters, digital camera image sensors (e.g., CCD or CMOS image sensors), or any suitable combination thereof. IR receiver 114 may be configured with hardware to detect the infrared signals using one or more infrared receiver integrated circuits and any suitable circuitry for converting information received from the infrared receiver integrated circuits into digital representations of the information.

Camera 116 may include hardware, software, or a combination therefore arranged to capture digital images. Camera 116 may include one or more of a web camera, digital camera, or any suitable hardware for capturing images. In certain configurations, camera 116 may be positioned so as to capture images of a user's face. For example, camera 116 may be built into display device 104 such that it is facing a user who is viewing display device 104 (FIG. 1). In other configurations, camera 116 may be mounted externally to display device 104, or mounted onto a headset worn by a user, such that it can capture images of a user's face.

Processor 118 includes one or more processors arranged within display device or eye tracking apparatus 110B. In certain configurations, processor 118 includes one or more processors that provide dedicated processing of data captured by IR receiver 114 and camera 116. In one example, processor 118 may receive raw data captured by IR receiver 114, convert the data to an infrared image, and calculate a distance measure between IR transmitter 112 and an object of interest in the image. In addition, processor 118 may analyze the infrared image to determine a presence or absence of a feature of a user's eyes, such as the presence or absence of an exposed pupil. In another example, processor 118 may receive raw data captured by camera 116 and convert it to a digital image. In addition, processor 118 may analyze the digital image according to one or more computer vision techniques in order to detect the presence or absence of a feature of the user's face, such as a pupil, a pigment of the eye, or an eyelid. In another example, processor 118 may analyze the digital image to track the user's point of gaze using one or more eye tracking algorithms. Processor 118 may receive, retrieve, and/or send data including, for example, data captured by IR receiver 114 and camera 116 to data storage 120. Processor 118 may store this data in any suitable image format.

Data storage 120 may store image data (e.g., image files), signal data (e.g., data indicative of signal presence or signal strength), software (e.g., for collecting and analyzing data captured from IR receiver 114 and camera 116, for performing eye tracking using camera 116, or for rendering a GUI on display device 104 (FIG. 1A)), connection information (e.g., information that enables components 110 or a component of eye tracking system 100A to establish communications with another system), data associated with positioning a movable indicator within a GUI presented by eye tracking system 100A (FIG. 1A) any other suitable data. Data storage 120 may include one or more storage mediums, including without limitation, a hard-drive, permanent memory such as ROM, semi-permanent memory such as RAM, solid state memory, removable memory, CD-ROM, CD-RW, diskette, firmware, a cache, and other like devices capable of storing electronic data. Data storage 120 may include a database. The database may include a relational database management system (RDBMS) and/or a structured query language (SQL) database, or the like.

Figure 1C:
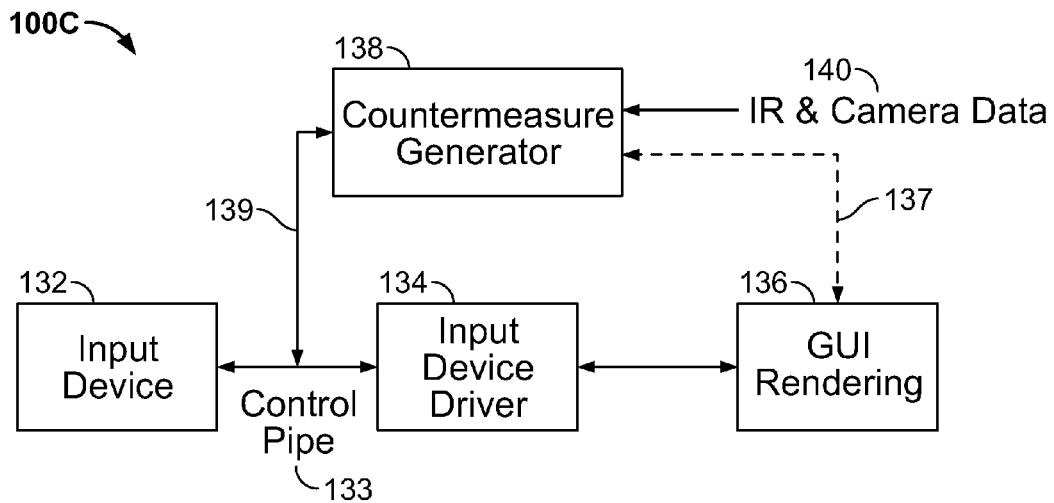
FIG. 1C is a diagram of a computer processing environment including various functions, applications; and/or routines running within an eye tracking system.

FIG. 1C is a diagram of a computer processing environment 100C including various functions, applications, and/or routines running within an eye tracking system such as, for example, eye tracking system 100A of FIG. 1A. The computer processing environment 100C may include input device module 132, input device driver 134, GUI rendering module 136, and countermeasure generator 138.

Input device module 132 receives input data from one or more input devices of the eye tracking system, and generates reports for each piece of data that describe what the data is actually measuring. These reports may be generated according to the report protocol of the USB Device Class Definition for Human Interface Devices (HID). In certain configurations, the input devices may include eye tracking apparatus 106. In such configurations, input device module 132 monitors eye tracking apparatus 106 for data that indicate changes in the user's point of gaze at a GUI. In certain configurations, the input devices may include user input device 108. In such configurations, input device module 132 monitors user input device 108 for changes in position, button states, or both, that indicate interactions with the position and selection functionality of a movable indicator within a GUI. Input device module 132 translates and packages that data into a report that defines items that describe these positions and button states, and then sends these reports over control pipe 133 to input device driver 134. In certain configurations, input device module 132 may be associated with one or more HID class devices.

Input device driver 134 receives the reports generated by input device module 132, and uses the information in the report to route commands to other components of the eye tracking system. In one example, input device driver 134 may receive a report that indicates a change in a position of a user input device (e.g., a change in position caused by a change in the user's point of gaze detected by eye tracking apparatus 106, or caused by a user's interaction with user input device 108). This change in position may correspond to a change in position of a movable indicator within a GUI. Input device driver 132 may examine this data and make a determination to route a command to GUI rendering module 136 to position the movable indicator within the GUI, to route data to an application programming interface (API) of GUI rendering module 136 associated with a mouse or trackpad, or both. In another example, input device driver 134 may receive a report that indicates a change in a button state that indicates an interaction with or selection of an object within a GUI. This change in button state may correspond to a selection of an object associated with the position of a movable indicator within the GUI. Input device driver 132 may examine this data and make a determination to route a command to GUI rendering module to activate the object associated with the interaction or selection, to route data to an API of GUI rendering module 136 associated with a mouse or trackpad, or both. In certain embodiments, input device driver 134 may be an HID class driver.

GUI rendering module 136 receives commands and data from input device driver 134, and translates the commands and data into renderings of objects within a GUI. In one example, GUI rendering module 136 may receive commands to reposition a movable indicator within the GUI at a particular position, and as a result draw or redraw a bitmap associated with the movable indicator at the position. In another example, GUI rendering module 136 may receive data associated with a relative change in position of a user input device (e.g., data that indicates that the user's point of gaze is 2 inches higher and 4 inches to the right on the display of the GUI). The GUI rendering module 136 may then translate this data into changes in position within the GUI (e.g., the user's point of gaze is now 20 pixels higher along the vertical axis and 40 pixels to the right along the horizontal axis), and renders the movable indicator based on the change in position (e.g., render the cursor 20 pixels higher along the vertical axis and 40 pixels to the right along the horizontal axis with respect to its previous position).

Countermeasure generator 138 receives infrared and camera data 140 as input, determines whether a user's perception of a movable indicator within a GUI presented by the eye tracking system is subject to fading, and communicates data to input device driver 134 or GUI rendering module 137 in order to provide a countermeasure (i.e., a counteracting measure) to reduce, prevent, or stop the fading. Infrared and camera data 140 may include one or more digital images (e.g., images from data captured by infrared receiver 114 or camera 116), data collected by one or more infrared receiver integrated circuits associated with infrared receiver 114, or data in any format collected by infrared receiver 114 and/or camera 116. In certain configurations, countermeasure generator 138 may be configured to analyze infrared and camera data 140 to recognize facial features associated with a user such as, for example, the presence or absence of an exposed pupil, a pigment in the eye, or an eyelid. Countermeasure generator 138 may then track the facial features over time such that a determination can be made as to whether the user closed and subsequently opened their eyes, signifying a blink. Countermeasure generator 138 may then prompt input device driver 134 or GUI rendering module 136 to alter the position of the movable indicator in order to counteract a perceptual fading of the movable indicator based on detecting this blink. Alternatively, or in addition, countermeasure generator 138 may also prompt GUI rendering module 136 to alter the visual appearance of the movable indicator. In certain configurations, countermeasure generator 138 may be configured to set and monitor one or more timers. These timers may periodically cause countermeasure generator 138 to prompt input device driver 134 or GUI rendering module 136 to alter at least one of the position or visual appearance of the movable indicator in the GUI.

In certain configurations, countermeasure generator 138 may be configured to analyze infrared and camera data 140 to determine whether a user's view of a display of a GUI is consistent over time. To make this determination, countermeasure generator 138 may analyze infrared and camera data 140 in order to calculate one or more of the user's viewing distance from a display, or the user's viewing angle with respect to a display. Countermeasure generator 138 may then monitor these measures over time in order to determine whether the user's view of a display of the GUI is consistent. If the user's view of the GUI is not consistent, countermeasure generator 138 may suspend altering the visual appearance or position of the movable indicator, as the user is not experiencing a perceptual fading of the movable indicator within the GUI because his viewing perspective of the GUI has been recently refreshed.

In certain configurations, the countermeasures provided by countermeasure generator 138 may be in the form of data associated with positioning a movable indicator within the GUI. This data may include one or more of positioning coordinates, patterns of coordinates, or commands to animate the movable indicator within the GUI. The positioning coordinates or patterns of coordinates may correspond to positions in the GUI that are different from the position associated with the user's point of gaze within the GUI. In certain configurations, countermeasure generator 138 may use coordinates associated with the current position of the movable indicator within the GUI to generate coordinates associated with altering the position of the movable indicator. In such configurations, countermeasure generator may request and receive coordinates associated with the current position of the movable indicator directly from GUI rendering module over communications path 137.

Countermeasure generator 138 may alter the received coordinates to reflect positions in the GUI where the movable indicator will be positioned or moved in order to counteract a perceptual fading of the movable indicator. When the current position of the movable indicator is persistently tracked to the user's point of gaze within the GUI, these positions are different than the position associated with the user's point of gaze within the GUI. In certain configurations, these altered coordinates may be communicated to input device driver 134 using communications path 139. In such configurations, countermeasure generator 138 may translate the altered positions into a report suitable for input device driver 134, such as the report protocol detailed in the USB Device Class Definition for Human Interface Devices (HID). The report may sent over communications path 139 and inserted into the data path of control pipe 133. In this manner, countermeasure generator 138 spoofs input device module 132 in order to alter the position of the movable indicator from a position associated with the user's point of gaze within the GUI. In certain configurations, countermeasure generator 138 may send commands to alter the position of the movable indicator directly to GUI rendering module 136 over communications path 137.

In certain configurations, the countermeasures provided by countermeasure generator 138 may be in the form of animations to alter the visual appearance of the movable indicator. In certain configurations, countermeasure generator 138 may generate the animations using any suitable rendering technique, including but not limited to Flash or HTML5 animations. In such configurations, countermeasure generator 138 may request and receive bitmaps representing the movable indicator from GUI rendering module 136. Alternatively, countermeasure generator 138 may access a standard library of bitmaps representing the movable indicator from, for example, the files of an operating system running on the eye tracking system and providing the rendering of the GUI. Countermeasure generator 138 may then generate one or more animations that perform a gradual scaling, shading, rotating or any combination thereof on the bitmap representing the movable indicator such that the visual appearance of the movable indicator itself is altered. For example, an animation may be generated where the bitmap representing the movable indicator may be gradually scaled and shaded such that it appears to have a three-dimensional depth. Countermeasure generator 138 may then transmit the animations to GUI rendering module 136 for display to the user upon a determination that the movable indicator is subject to a perceptual fading (e.g., the detection of a user blink). In other configurations, countermeasure generator 138 may send commands to GUI rendering module 136 to generate the animations of the movable indicator. In such configurations, these commands may trigger the operating system providing the rendering of the GUI to perform the animations.

Figure 1D:
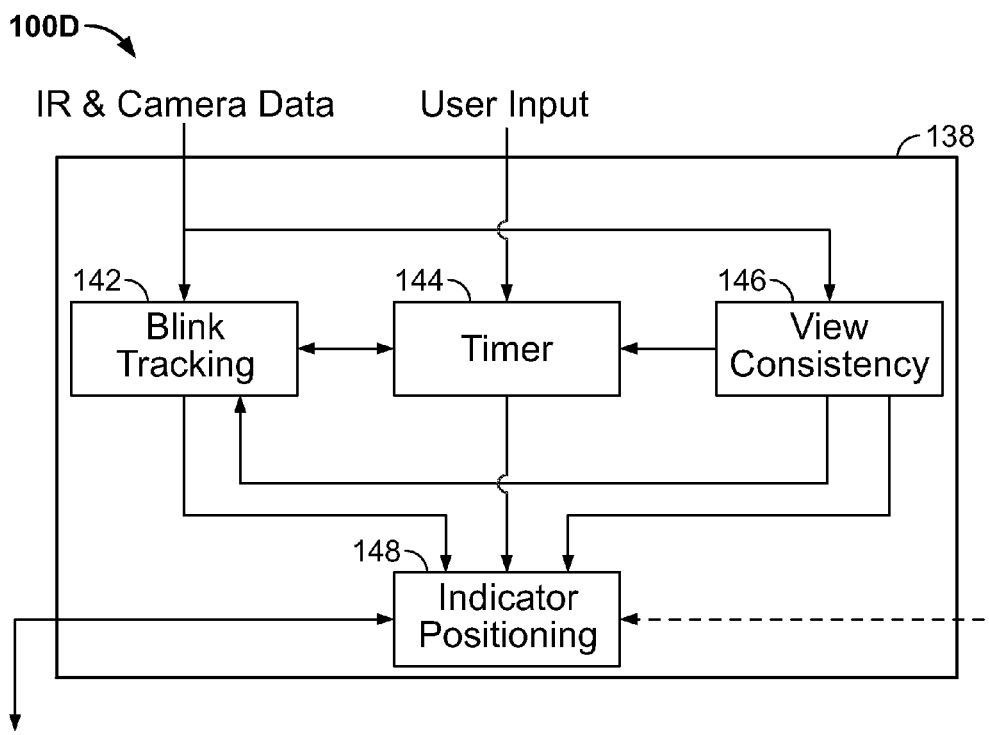
FIG. 1D is a diagram of a more detailed view of a countermeasure generator within the computer processing environment of FIG. 1C.

FIG. 1D a diagram 100D of a more detailed view of countermeasure generator 138 within the computer processing environment 100C of FIG. 1C. Countermeasure generator 138 may include blink tracking module 142, timer module 144, view consistency module 146, and indicator positioning module 148. Blink tracking module 142 may receive infrared and camera data as input, and determine whether a user of the eye tracking system has closed and subsequently opened their eyelids. In certain configurations, blink tracking module 142 may make this determination using digital images of the user's eyes. In such configurations, blink tracking module 142 may employ one or more computer vision techniques, such as image filtering, edge detection, thresholding, object recognition, or color processing in order to detect the presence or absence of a user's exposed pupils, eyelids, or a pigment of the user's eye in order to detect whether the user's eyes are open and subsequently close. In certain configurations, blink tracking module 142 may make this determination using infrared images of a user's eyes. In such configurations, the infrared images may be captured and analyzed according to bright pupil eye tracking, dark pupil eye tracking, or any combination thereof to detect a presence and subsequent absence of a reflection of infrared light or near-infrared light off of the pupil of the user's eyes. In certain configurations, blink tracking module 142 may use a state machine to detect the occurrence of a blink. In certain configurations, when a user has initiated a blink (i.e., a user has closed their eyes but not yet opened them), blink tracking module 142 may send an indication of the blink to indicator positioning module 148. This indication may represent that a blinking of the user has been detected.

Timer module 144 may initialize and run one or more timers associated with periodically altering the position of a movable indicator in a GUI of the eye tracking system. Timer module 144 may initialize a timer to a particular period of time, and then send an indication that the period of time has elapsed to indicator positioning module 148. These indications may cause the position of the movable indicator to be altered. In certain configurations, this period of time may be based on received user input. For example, a user of the eye tracking system may specify a length of time that defines a frequency at which they want the movable indicator to be repositioned. This length of time may range from a few milliseconds to a few seconds. A timer may be set based on the length of time, and then the timer may count down until it reaches zero. When the timer reaches zero, timer module 144 may send an indication that the period of time has elapsed to indicator positioning module 148, and reset the timer to the specified length of time. The timer may then count down to zero, and another indication that the period of time has elapsed may be sent to indicator positioning module 148. This sequence of events may repeat indefinitely, or until the user input indicates that the repositioning of the movable indicator should no longer occur. In certain configurations, timer module 144 may initialize a timer based on an indication from blink tracking module 142 that a user has closed their eyes. This timer may be initialized at a period of time equivalent to the average amount of time of a human blink. When this timer elapses, an indication may be sent to blink tracking module 142 that the blink tracking module should detect the opening of the user's eyes shortly thereafter the indication is received. This indication may prompt the blink tracking module 142 to reset its state machine (i.e., return to a state associated with the user's eyes being opened).

View consistency module 146 may receive infrared and camera data as input, and determine whether a user's view of a display of the GUI has remained consistent over a particular period of time (i.e., whether the user's viewing position with respect to the physical display of the GUI has remained consistent). This determination may indicate to the eye tracking system that the user's view of the GUI has recently changed. Accordingly, this determination may be used to suspend altering the position or visual appearance of the movable indicator to counteract the perceptual fading of the movable indicator for a predetermined period of time. For example, a user viewing the GUI on a laptop may reposition the laptop from their lap to a desk over a five second period. This repositioning may cause consistency module 146 to determine that the user's view of the GUI has not been consistent within the last five seconds, and may suspend altering the position or visual appearance of the movable indicator to counteract the perceptual fading of the movable indicator within a ten second period after the repositioning was detected. In certain configurations, view consistency module 146 may communicate an indication to blink tracking module 142 to stop the detection of user blinking for a predetermined period of time, communicate an indication to timer module 144 to suspend one or more timers or a predetermined period of time, and/or communicate an indication to indicator positioning module 148 to suspend altering the position or visual appearance of the movable indicator in the GUI for a predetermined period of time.

In certain configurations, view consistency module 142 may make this determination using digital images of the user's eyes. In such configurations, one or more suitable computer vision techniques may be used to calculate the user's viewing angle with respect to the display of the GUI or viewing distance from the display of the GUI. In certain configurations, view consistency module 146 may make this determination using reflections of infrared signals off of the user's face. The time that it takes for such signals to be transmitted and received may allow view consistency module 146 to estimate the proximity of the user's face with respect to an infrared transmitted built-in or mounted on the display of the GUI. This proximity may be estimated using any suitable IR sonar algorithm.

Indicator positioning module 148 may receive input from blink tracking module 142, timer module 144, and view consistency module 146 and generate countermeasures. The countermeasures provided by indicator positioning module 148 may be similar to those described with respect to countermeasure generator 138. In one example, indicator positioning module 148 may define one or more positions in the GUI that are different than the position associated with the user's point of gaze within the GUI. When indicator positioning module 148 receives an indication that a blink has been detected from blinking tracking module 142 or an indication that a timer has elapsed from timer module 144, indicator positioning module 148 may generate data to send to input device driver 134 to alter the position of a movable indicator in the GUI to one of the defined positions, or send a command directly to GUI rendering module 136 to do the same. In another example, indicator positioning module 148 may define a pattern that includes one or more positions in the GUI that are different than the position associated with the user's point of gaze within the GUI. When indicator positioning module 148 receives an indication that a blink has been detected from blinking tracking module 142 or an indication that a timer has elapsed from timer module 144, indicator positioning module 148 may generate data to send to input device driver 134 to alter the position of a movable indicator in the GUI to one of the positions in the defined pattern in a round robin fashion such that the position of the movable indicator cycles through the positions in the defined pattern repeatedly.

In certain configurations, indicator positioning module 148 may alter the visual appearance of a movable indicator within the GUI upon receiving an indication that a blink has been detected from blink tracking module 142 or an indication that a timer has elapsed from timer module 144. For example, when indicator positioning module 148 receives one or more of these indications, an animation or command to animate the movable indicator may be generated and transmitted to GUI rendering module 136. In certain configurations, indicator positioning module 148 may suspend generating data or commands associated with altering the position or visual appearance of the movable indicator when an indication is received from view consistency module 146 that the user's view of the GUI is not consistent.

Figure 2A:
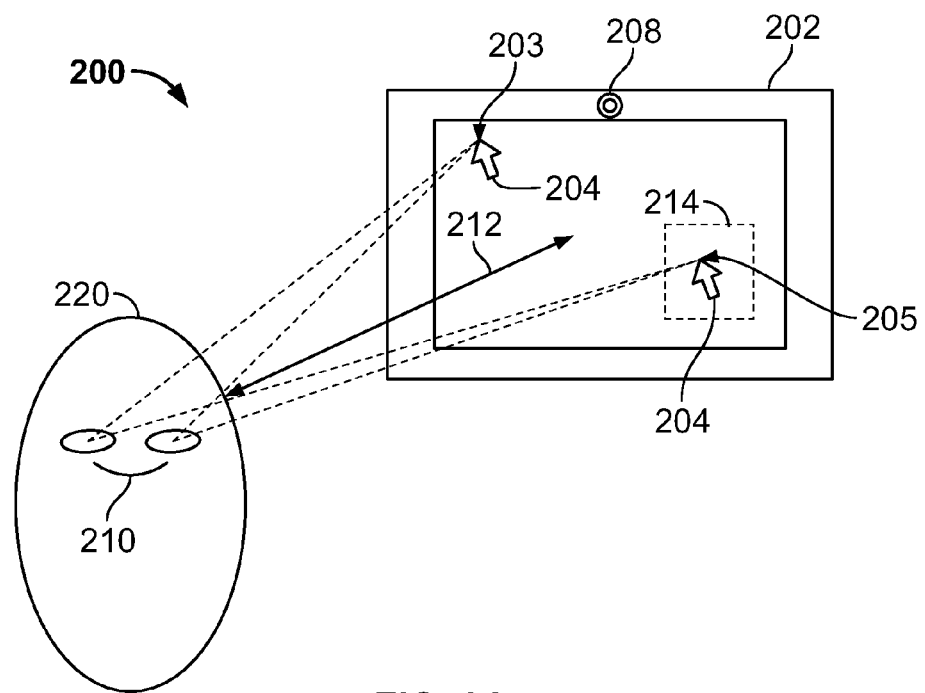
FIG. 2A is a diagram of a side view of a user interacting with a GUI presented by the eye tracking system.

FIG. 2A is a diagram of a side view of a user 220 interacting with a GUI presented by an eye tracking system 200. As illustrated, eye tracking system 200 includes display 202 and imaging components 208. Display 202 may be substantively similar to display device 104 described with respect to eye tracking system 100A (FIG. 1A), and imaging components 208 may include one or more of components 110 described with respect to display device or eye tracking apparatus 100B (FIG. 1B). Eye tracking system 200 may also include processor 102 and user input device 108 as described with respect to eye tracking system 100A (FIG. 1A). In certain configurations, imaging components 208 may provide eye tracking functionality substantively similar to that described with respect to eye tracking apparatus 106 (FIG. 1A). In certain configurations, imaging components 208 may provide infrared and camera input for blink tracking apparatus 142 and view consistency module 146 (FIG. 1D). For example, eye tracking components 110 may include a web camera capturing digital images and tracking the user's point of gaze on display 202, a digital camera with an infrared filter for capturing digital images focused on the infrared spectrum, and infrared transmitters and a receiver for capturing the reflections of infrared signals to determine the proximity of user 220 to display 202.

Display 200 and imaging components 208 may be integrated within the packaging of other devices or structures such as a vehicle, video game system, entertainment system, personal computer (PC), personal digital assistant (PDA), a portable computing device, or a cellular telephone. Further, display 200 and imaging components 208 may be integrated into any suitable user device such as, for example, an Apple® iPod®, iPad®, iPhone®, iMac®, MacBook Pro®, and MacBook Air®, and the like, that are made available by Apple Inc., of Cupertino, Calif., any other devices capable of rendering and displaying a GUI.

In certain configurations, user 220 may control the position of a movable indicator within the GUI presented by eye tracking system 200 on display 202 using their eyes 210. In such configurations, imaging components 208 may track the movements of the user's eyes 210 and determine the user's point of gaze using any suitable eye tracking technique, including but not limited to Pupil Centre Corneal Reflection (PCCR) using dark pupil eye tracking, bright pupil eye tracking, or both. The user's point of gaze at display 202 may be converted by eye tracking system 200 to a particular position (e.g., a vertical and horizontal coordinate) within the GUI. This conversion may be performed by one or more of processor 102 (FIG. 1A) or processor 118 (FIG. 1B).

Throughout their interaction with the GUI presented on display 202, the user may fix their point of gaze on different positions of display 202. As shown in FIG. 2A, user 220 may direct their eyes 210 to a first point of gaze 203, and subsequently direct their eyes to a second point of gaze 205. When the user directs their eyes 210 to first point of gaze 203, the GUI may render or place a movable indicator, such as cursor 204, around or adjacent to the position associated with the first point of gaze 203. In one example, as illustrated in FIG. 2A, the pixels associated with the tip of the bitmap representing cursor 204 are rendered adjacent to the position in the GUI associated with the first point of gaze 203. When the user directs their eyes 210 to second point of gaze 205, the GUI may render or place the same movable indicator around or adjacent to the position associated with the second point of gaze 204. In one example, as illustrated in FIG. 2A, the pixels associated with the tip of the bitmap representing cursor 204 are rendered adjacent to the position in the GUI associated with the second point of gaze 203.

In certain configurations, when the user's point of gaze transitions from first point of gaze 203 to second point of gaze 204, cursor 204 glides between the positions in the GUI associated with these points of gaze. In other words, cursor 204 is rendered at several intermediate positions along an axis in the GUI connecting first point of gaze 203 to second point of gaze 204 before being rendered around or adjacent to the position in the GUI associated with the second point of gaze 204. In another configurations, when the user's point of gaze transitions from first point of gaze 203 to second point of gaze 204, the cursor may not be rendered at any intermediate positions between first point of gaze 203 and second point of gaze 204. In either configuration, when the cursor 204 is persistently tracked to the user's point of gaze, the cursor 204 will become a stabilized retinal image with respect to eyes 210 of user 220. This will cause a perceptual fading of cursor 204 with respect to the GUI presented on display 202.

When interacting with a GUI presented by eye tracking system 200 on display 202, user 220 may position themselves at distance 212 from display 202. Data associated with distance 212 may be monitored by imaging components 208, and this data may be used by view consistency module 146 to calculate distance 212. In one example, imaging components 208 may transmit and receive reflections of infrared signals to determine distance 212. In another example, imaging components 208 may capture digital images of user 220 to determine distance 212. Distance 212 may vary as the user interacts with the GUI presented on display 202. For example, when display 202 is integrated into a handheld device such as a MacBook Air®, user 220 may modify their distance 212 from display 202 as they perform different tasks such as using the device while working at a desk or browsing the internet while using the device on their lap. While is static or consistent within a predetermined range of distances over a period of time (e.g., distance 212 does not increase or decrease by more than 2 inches over a 5 second window of time), cursor 204 will become a stabilized retinal image with respect to eyes 210 of user 220. This will cause a perceptual fading of cursor 204 with respect to the GUI presented on display. In certain configurations, measures to counteract this perceptual fading may be provided by countermeasure generator 138 (FIG. 1C). However, if distance 212 is inconsistent in that it falls outside of a predetermined range of distances over a period of time (e.g., distance 212 increases or decreases by more than 2 inches over a 5 second window of time), user 220 may no longer experience the perceptual fading of cursor 204. In certain configurations, one or more operations of countermeasure generator 138 (FIG. 1C) may be suspended until distance 212 returns to being static or within a predetermined range of distances over a period of time.

Figure 2B:
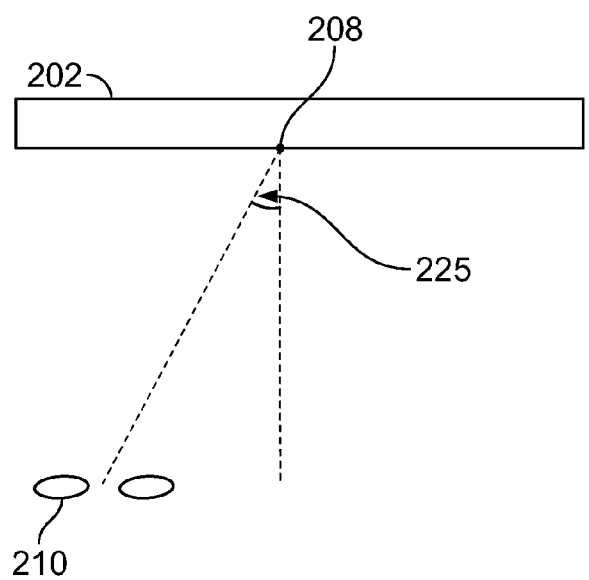
FIG. 2B is a diagram of an overhead view of a user interacting with a GUI presented by the eye tracking system.

FIG. 2B is a diagram of an overhead view of a user interacting with a GUI presented by the eye tracking system 200 on display 202. When interacting with the GUI presented on display 202, user 220 may position themselves at angle 225 from center of display 202. Data associated with angle 225 may be monitored by imaging components 208, and this data may be used by view consistency module 146 to calculate angle 225. In one example, imaging components 208 may capture digital images of eyes 210 of user 220 to determine angle 225. In certain configurations, as illustrated, angle 225 may be measured from a first ray or axis that is defined parallel to the line of sight of imaging components 208 and perpendicular to the surface of display 202, and a second ray or axis defined between the position of imaging components 208 and a midpoint between eyes 210 of user 220. In other configurations, angle 225 may be defined according to any suitable rays or axes defined in relation to the line of sight of imaging components 208 and eyes 210 of user 220. Similar to distance 212, if angle 225 remains static or consistent within a predetermined range over a period of time (e.g., angle 225 increases or decreases by no more than 5 degrees over a 5 second period of time), cursor 204 will become a stabilized retinal image with respect to eyes 210 of user 220. This will cause a perceptual fading of cursor 204 with respect to the GUI presented on display. However, if angle 225 is inconsistent in that it falls outside of a predetermined range of angles over a period of time (e.g., angle 225 increases of decreases by more than 5 degrees over a 5 second period of time), user 220 may no longer experience the perceptual fading of cursor 204. In certain configurations, measures to counteract this perceptual fading may be provided by countermeasure generator 138 (FIG. 1C) if angle 225 is consistent over a period of time. In addition, if angle 225 is inconsistent over a period of time, one or more operations of countermeasure generator 138 (FIG. 1C) may be suspended until angle 225 returns to being static or within a predetermined range of angles over a period of time.

Figure 3A:
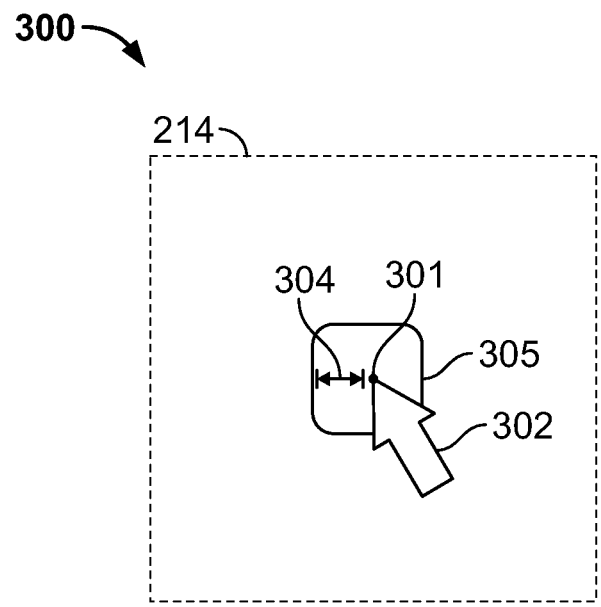
FIGS. 3A and 3B are detailed views of a movable indicator within a GUI presented by the eye tracking system.
Figure 3B:
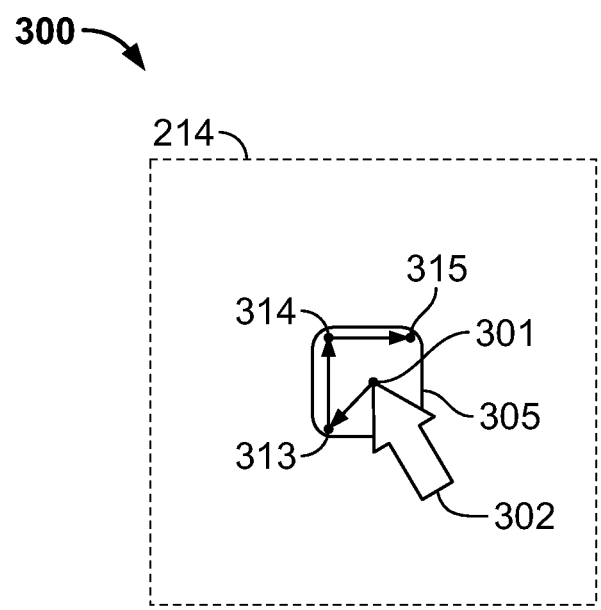

FIGS. 3A and 3B are detailed views 214 of a movable indicator within a GUI presented by the eye tracking system 200. All rendering discussed with respect to FIGS. 3A and 3B may be performed by GUI rendering module 136 (FIG. 1C). As illustrated in FIGS. 3A and 3B, the movable indicator is rendered by the GUI in the form of cursor 302. In certain configurations, countermeasure generator 138 (FIG. 1C) may alter the position of the movable indicator within the GUI in order to counteract a perceptual fading of the movable indicator with respect to the GUI. In such configurations, positions may be defined within the GUI that are different from the position associated with the user's point of gaze within the GUI. The movable indicator may then be rendered at these different positions so as to counteract a perceptual fading of the movable indicator with respect to the GUI. In certain configurations, these different positions in the GUI may be selected from a set of positions located around a bitmap representing the movable indicator in the GUI. For example, as illustrated in FIG. 3A, the positions in the GUI may be selected from a set of positions located around a pixel associated with the tip 301 of the bitmap representing cursor 302. In certain configurations, these different positions may be located a predefined amount of pixels from a point on the bitmap representing the movable indicator. For example, as illustrated in FIG. 3A, the positions in the GUI may be selected from a set of positions located a predefined amount of pixels 304 from the pixel associated with the tip 301 of the bitmap representing cursor 302.

In other configurations, these different positions may be selected from a set of positions within a boundary located around a position associated with the user's point of gaze within the GUI. This boundary may be of any suitable shape or size. For example, tip 301 of cursor 302 may be rendered by the GUI at the user's point of gaze within the GUI. Boundary 305 may be defined, as illustrated in FIG. 3A, as a square shaped box with rounded corners around tip 301 of cursor 302. Positions different from tip 301 of cursor 302 may then be defined within boundary 305. Cursor 302 may then be rendered at these different positions so as to counteract a perceptual fading of the movable indicator with respect to the GUI. In certain configurations, cursor 302 may be placed or rendered at one of these different positions each instance the eye tracking system detects a blinking of the user's eyes or the passage of time—for example, each instance that blink tracking module 142 (FIG. 1D) detects a blinking of the user's eye or a timer set by timer module 144 (FIG. 1D) elapses (e.g., reaches zero). Tip 301 and boundary 305 in FIGS. 3A and 3B are for illustration purposes only, and may not be rendered as part of the display of the GUI.

In certain configurations, a repeating pattern may be defined that includes positions in the GUI that are different from the position associated with the user's point of gaze. The movable indicator may then be placed or rendered at these different positions in a round-robin fashion so as to counteract a perceptual fading of the movable indicator with respect to the GUI. These different positions may be defined according to any of the techniques discussed with respect to FIG. 3A. For example, as illustrated in FIG. 3B, boundary 305 may be defined around tip 301 of cursor 302, which represents a position in the GUI associated with the user's point of gaze within the GUI. A repeating pattern may be defined that includes first position 313, second position 314, and third position 315. Although each of first position 313, second position 314, and third position 315 are illustrated as being located on boundary 305, these positions may be any suitable pixels on or within boundary 305.

As illustrated by the arrows in FIG. 3B position of cursor 302 may be altered by periodically rendering cursor 302 at each of first position 313, second position 314, and third position 315, repeatedly in that order, upon each instance the eye tracking system detects a blinking of the user's eyes or the passage of time. In certain configurations, cursor 302 may be rendered at each new position by drawing the cursor such that tip 301 aligns with each of first position 313, second position 314, and third position 315. In other configurations, cursor 302 may be rendered at each new position by drawing the cursor at any suitable position in relation to each of first position 313, second position 314, and third position 315. In certain configurations, cursor 302 glides between first position 313, second position 314, and third position 315 such that it is rendered at several intermediate points between the positions. In other configurations, cursor 302 may be rendered at each new position without rendering cursor 302 at intermediate points between each of first position 313, second position 314, and third position 315.

Figure 4:
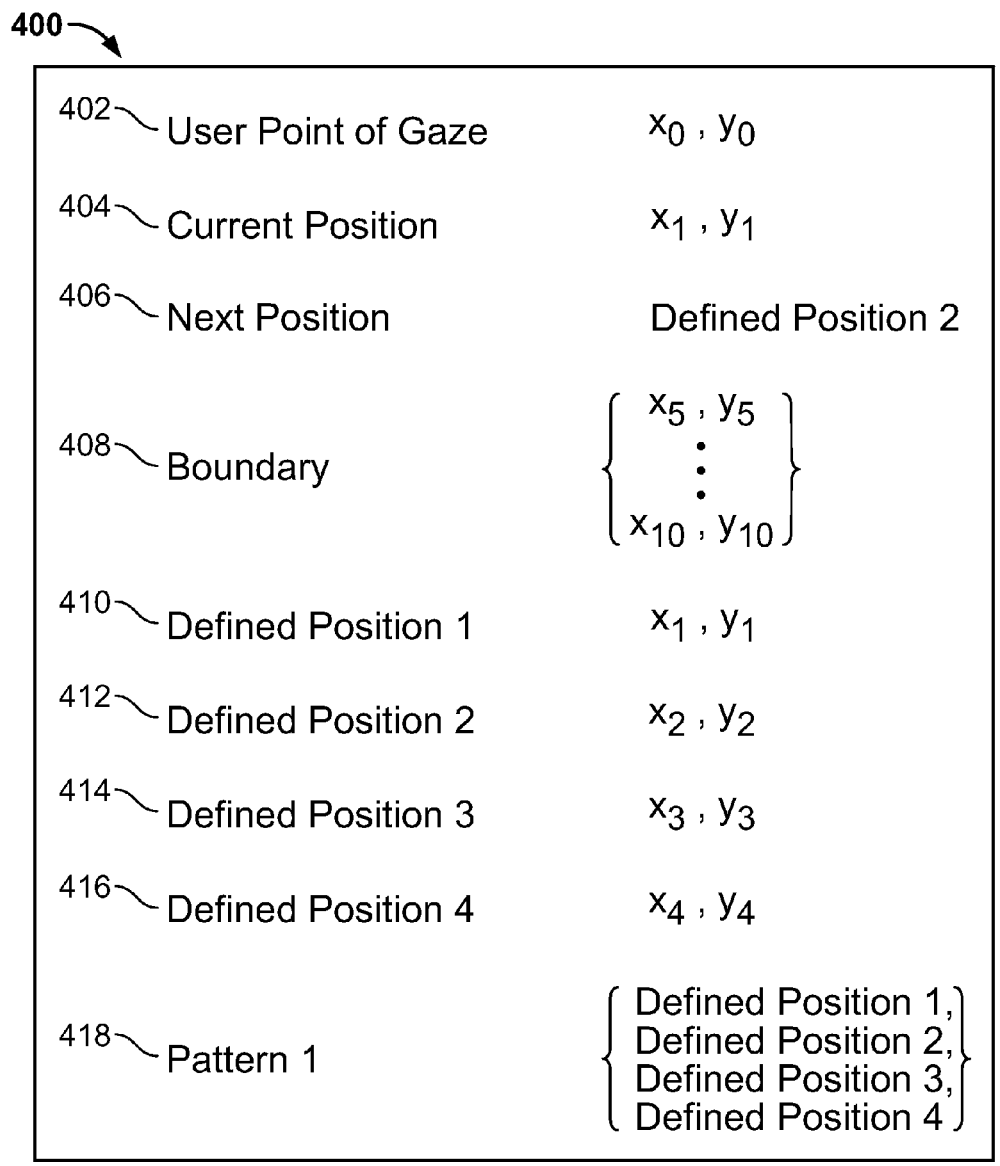
FIG. 4 is a diagram of data associated with positioning a movable indicator within a GUI presented by the eye tracking system.

FIG. 4 is a diagram of data 400 associated with positioning a movable indicator, such as movable indicator 204 (FIG. 2) within a GUI presented by eye tracking system 200. Data 400 includes user point of gaze 402, current position 404, next position 406, boundary 408, defined positions 410, 412, 414, and 416, and pattern 418. Each of data 402 may be any data structure suitable for storing one or more coordinates representing positions within a GUI presented by eye tracking system 200, or a pointer to a data structure storing coordinates representing positions within a GUI. These coordinates may be in a two-dimensional format that conveys the horizontal and vertical position of the coordinate relative to a predefined origin within the GUI. Data 400 may be stored by data storage 120 (FIG. 1B). In certain configurations, GUI rendering module 136 (FIG. 1C) may maintain read and write access to data 400. In other configurations, one or more modules of countermeasure generator 138 (FIG. 1C), such as indicator positioning module 148, may maintain read and write access to data 400.

User point of gaze 402 may reflect coordinates representing the position associated with the user's current point of gaze within the GUI presented by eye tracking system. In certain configurations, user point of gaze 402 may be translated from a physical position on the display associated with where the user the user is looking, such as first point of gaze 203 or second point of gaze 204. This translation may be performed according to any suitable perspective transform, and may be calculated using one or more of processor 102 (FIG. 1A) or processor 118 (FIG. 1B).

Current position 404 reflects coordinates representing the actual position where a movable indicator is rendered within the GUI. This position may be associated with any pixel on a bitmap representing the movable indicator. When the position of the movable indicator is being altered to counteract a perceptual fading of the movable indicator, current position may be different from user point of gaze 402. However, when the position of the movable indicator is not being altered, current position 404 may correspond to user point of gaze 402. In certain configurations, current position 404 may be a pointer to a position within pattern 418.

Next position 406 reflects a coordinates representing a position where the movable indicator is to be positioned in the future. In certain configurations, next position 406 may represent one position in a defined repeating pattern of positions. For example, as illustrated, next position 406 may be a pointer to one of the positions in pattern 418. In other configurations, next configuration 406 may represent a position randomly selected from a set of defined positions, such as the set of positions defined by boundary 408. Next position 406 may change to a different position once the position of the movable indicator is altered on a particular event, such as a passage of time, or a blinking of the user's eyes. Once such an event occurs, next position 406 may change to a different position in pattern 418, or a different randomly selected position of the set of positions in boundary 408. In this manner, the user's perception of the movable indicator may be refreshed to counteract a perceptual fading of the movable indicator with respect to the GUI.

Boundary 408 reflects coordinates representing a set of positions on or within a boundary defined around user point of gaze 402. This boundary may be established substantially similar to boundary 305 discussed with respect to FIGS. 3A and 3B. In certain configurations, boundary 408 may include a data structure enumerating each of the positions on or within the defined boundary. In other configurations, boundary 408 may include a data structure enumerating only the positions on the defined boundary.

Defined positions 410, 412, 414, and 416 reflect coordinates representing positions in the GUI that have been selected for relocating or altering the position of the movable indicator. In certain configurations, these defined positions may be selected randomly from the set of positions in boundary 408. In other configurations, these defined positions may be selected according to a geometric pattern formed from among the set of positions in boundary 408. For example, the defined positions may be selected according to the vertices of a triangular shape formed within boundary 408. Although only four defined positions are illustrated in FIG. 4, data 400 may contain any suitable number of defined positions.

Pattern 418 reflects coordinates representing a set of defined positions in a predetermined order that represent a pattern of positions for the movable indicator to be relocated to within the GUI. Pattern 318 may include one or more of defined positions 410, 412, 414, and 416. In certain configurations, next position 406 may contain a pointer that traverses the data structure associated with pattern 418 to define a repeated pattern of movement for the movable indicator within the GUI. For example, the movable indicator may be relocated to the positions defined by pattern 418 in a repeating round robin fashion upon a particular event, such as the passage of time or the blinking of the user's eyes. In this manner, the user's perception of the movable indicator may be refreshed to counteract a perceptual fading of the movable indicator with respect to the GUI.

Figure 5:
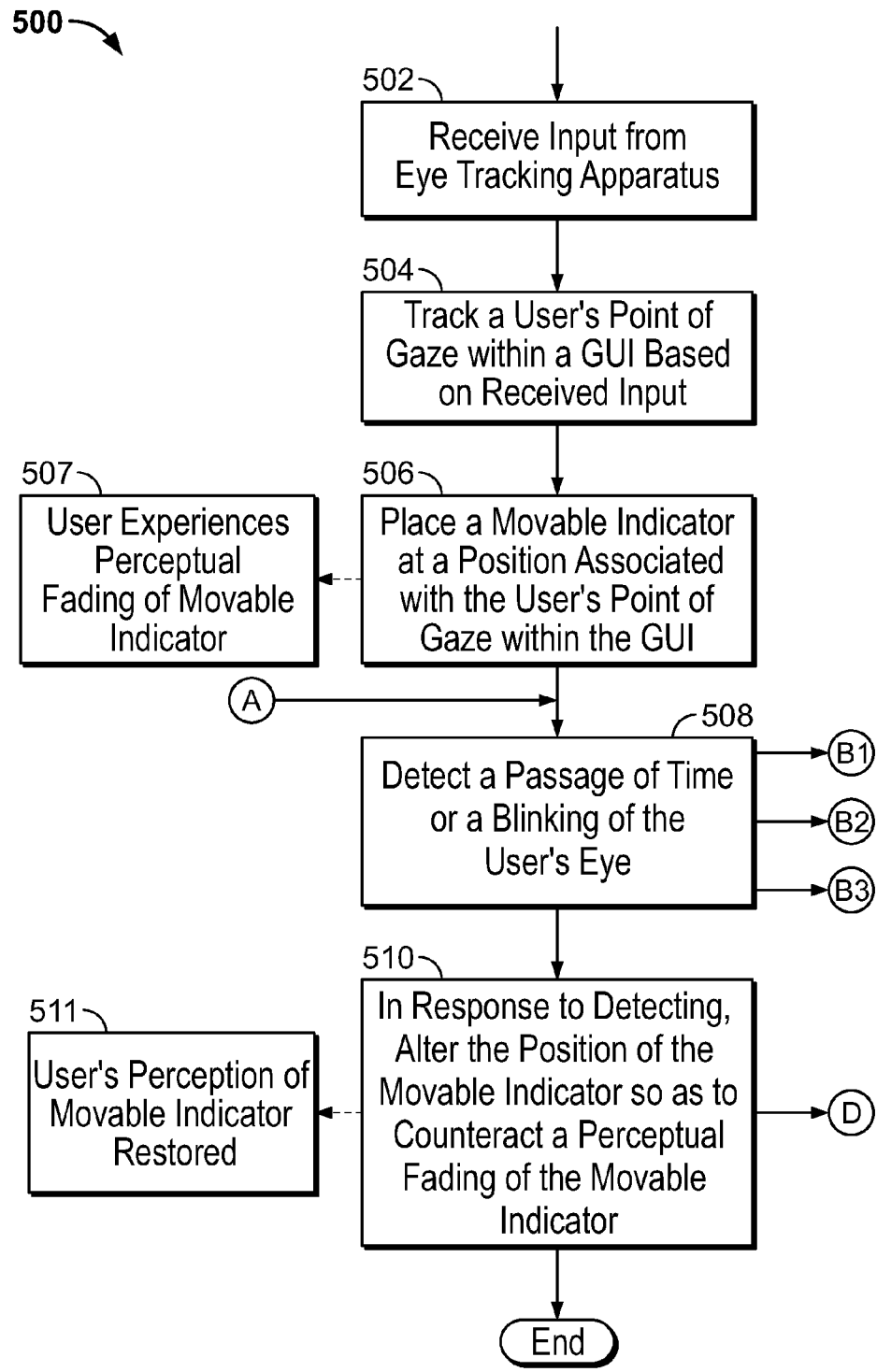
FIG. 5 is a flow diagram of a process for counteracting a perceptual fading of a movable indicator within a GUI presented by the eye tracking system.

FIG. 5 is a flow diagram of a process 500 for counteracting a perceptual fading of a movable indicator within a GUI presented by an eye tracking system. One or more of the steps of process 500 may implemented by an eye tracking system such as systems 100A and 200 of FIGS. 1A and 2A using, for example, one or more modules 132, 134, 136, 138 of FIG. 1C and modules 142, 144, 146, and 148 of FIG. 1D.

In one implementation, an eye tracking system, such as eye tracking system 100A, includes an eye tracking apparatus 106 including one or more components 110 arranged to capture images of a user's eyes. These images may be captured at any suitable frequency, using any suitable technique including, but not limited to, bright pupil eye tracking, dark pupil eye tracking, or both. Further, these images may detail the corneas of a user's left eye, right eye, or both. In certain configurations, the images may be captured in two phases: a calibration phase, and an eye tracking phase. Images captured in the calibration phase may be used to determine characteristics of a user's pupils such that subsequent images captured in the eye tracking phase may be processed faster or with greater accuracy. Once captured, the images may be stored in data storage 120. At step 502, a processor, such as processor 102 or 118 receives input from the eye tracking apparatus 106. This input may include, but is not limited to, the captured images of the user's eyes, time stamps associated with the images, data indicating whether the images correspond to a left eye or right eye, or any other suitable image metadata. Process 500 then proceeds to step 504.

At step 504, a user's point of gaze within a GUI presented by eye tracking system 100A is tracked based on the received input. In certain implementations, this tracking may be performed by processor 102 or 118 using any suitable eye tracking algorithm, including but not limited to PCCR. The tracking algorithm may determine what physical position on a display of the GUI the user is looking at, and then convert this physical position to data reflecting a coordinate within the GUI. Data associated with this coordinate may be stored in any suitable data structure, such as user point of gaze 402 of data 400. In certain implementations, the tracking that occurs at step 504 may continually monitor the input received from the eye tracking apparatus to determine multiple positions associated with the user's point of gaze over time. In such implementations, each time the user's point of gaze changes an updated position may be written to user point of gaze 402 within data 400. In certain implementations, this tracking may be persistent in that it occurs substantially in real-time. In this context, real-time eye tracking may be defined as determining the user's point of gaze at a rate equal to or greater than the amount of times a user's gaze changes per second such that each change is detected. Determining the user's point of gaze at this rate may require the eye tracking apparatus 106 to capture data higher than this rate, such as 60 times per second. Process 500 proceeds to step 506.

At step 506, a movable indicator is placed or rendered at a position associated with the user's point of gaze within the GUI. For example, a user may fix their gaze on a button in a web browser that allows the user to go to a previous page in the web browser's history. The GUI may then render a cursor on the button such that the user may select the button using other input provided using, for example, user input device 108 such as a trackpad tap of mouse click. Further, at step 506, GUI rendering module 136 may read data associated with user point of gaze 402 within data 400, and render a bitmap associated with the movable indicator at a position around or adjacent to user point of gaze 402. The position around or adjacent to user point of gaze 402 may be on the edge of the bitmap associated with a movable indicator, such as the tip of an arrow-shaped cursor, or in a central position of the bitmap, such as the center of a hand-shaped cursor. This position may be consistent in that the movable indicator is always rendered at the same position relative to the user's point of gaze when the user's point of gaze changes.

In certain implementations, the placement or rendering that occurs at step 506 may occur continually such that the placement or rendering of the cursor is always at a position around, adjacent to, or at a distance from the user's point of gaze. This may cause the movable indicator be a stabilized retinal image with respect to the user. As a result of step 506, feature 507 of process 500 shows that the user experiences a perceptual fading of the movable indicator. This perceptual fading may cause the movable indicator to partially or completely disappear such that the user loses track of the position of the movable indicator. This perceptual fading is undesirable when the user wants to select or interact with an object in the GUI, as the user does not know where in the GUI the movable indicator is positioned. Thus, it would be advantageous to provide a measure to alter the position of the movable indicator in a way that avoids distracting or annoying the user. Process 500 then proceeds to step 508.

At step 508, a passage of time or a blinking of a user's eyes is detected. These events may indicate to the eye tracking system appropriate times at which to alter the position of the movable indicator to counteract a perceptual fading of the movable indicator. In certain configurations, the passage of time may be detected as will be discussed with respect to FIG. 7. In certain configurations, a blinking of the user's eyes may be detected as will be discussed with respect to FIGS. 8A, 8B, and 8C. In certain configurations, the detection of these events may be monitored at a frequency that is equal to or greater than the frequency of the tracking of the user's point of gaze. For example, indicator positioning module 148 may poll blink tracking module 142 and timer module 144 for the occurrence of these events at a rate equal to or greater than the rate at which eye tracking apparatus 106 determines the position associated with the user's point of gaze. Process 500 proceeds to step 510.

At step 510, the position of the movable indicator is altered in response to the detecting so as to counteract a perceptual fading of the movable indicator. As described with respect to FIG. 1C, a command may be sent from countermeasure generator 138 to GUI rendering module 136 to redraw or rerender the movable indicator at one or more positions in the GUI different from the position associated with the user's point of gaze. Alternatively, as described with respect to FIG. 1C, countermeasure generator 138 may generate coordinates associated with altering the position of the movable indicator and send such coordinates directly to input device driver 134, which in turn prompts GUI generator module 136 to redraw or rerender the movable indicator at those coordinates. In certain configurations, the different positions may be defined from a set of positions located around the position associated with the user's point of gaze. In certain configurations, these positions may be selected randomly. In other configurations, these positions may be selected according to a predetermined geometric pattern, such as a triangular or circular shape around the position associated with the user's point of gaze. The process of defining these positions and/or patterns will be further discussed with respect to FIG. 9. Additionally, in certain configurations the cursor may be redrawn at several intermediate positions in between the current position of the cursor (e.g., the position associated with the user's point of gaze, or an intermediate position within a predefined pattern) and the position at which the movable indicator is relocated (e.g., one of the defined positions in the GUI that are different from the user's point of gaze).

As illustrated by feature 511, altering the position of the movable indicator at step 510 may cause the user's perception of the movable indicator to be refreshed. In other words, the movable indicator will no longer be a static retinal image with respect to the user's eyes. As a result, the perceptual fading of the movable indicator may cease, and the movable indicator may be fully visible to the user.

In an alternative implementation, the visual appearance of the movable indicator may be altered at step 510 in place of or in addition to altering the position of the movable indicator. One or more animations may be generated that perform a gradual scaling, shading, rotation, or any combination thereof on the bitmap representing the movable indicator such that the visual appearance of the movable indicator itself is altered. In certain configurations, these animations may not block or obstruct other information in the GUI such that the animation does not distract or detract the user's viewing of the GUI. These animations may be generated by countermeasure generator 138 or GUI rendering module 136. Process 500 then ends.

Figure 6:
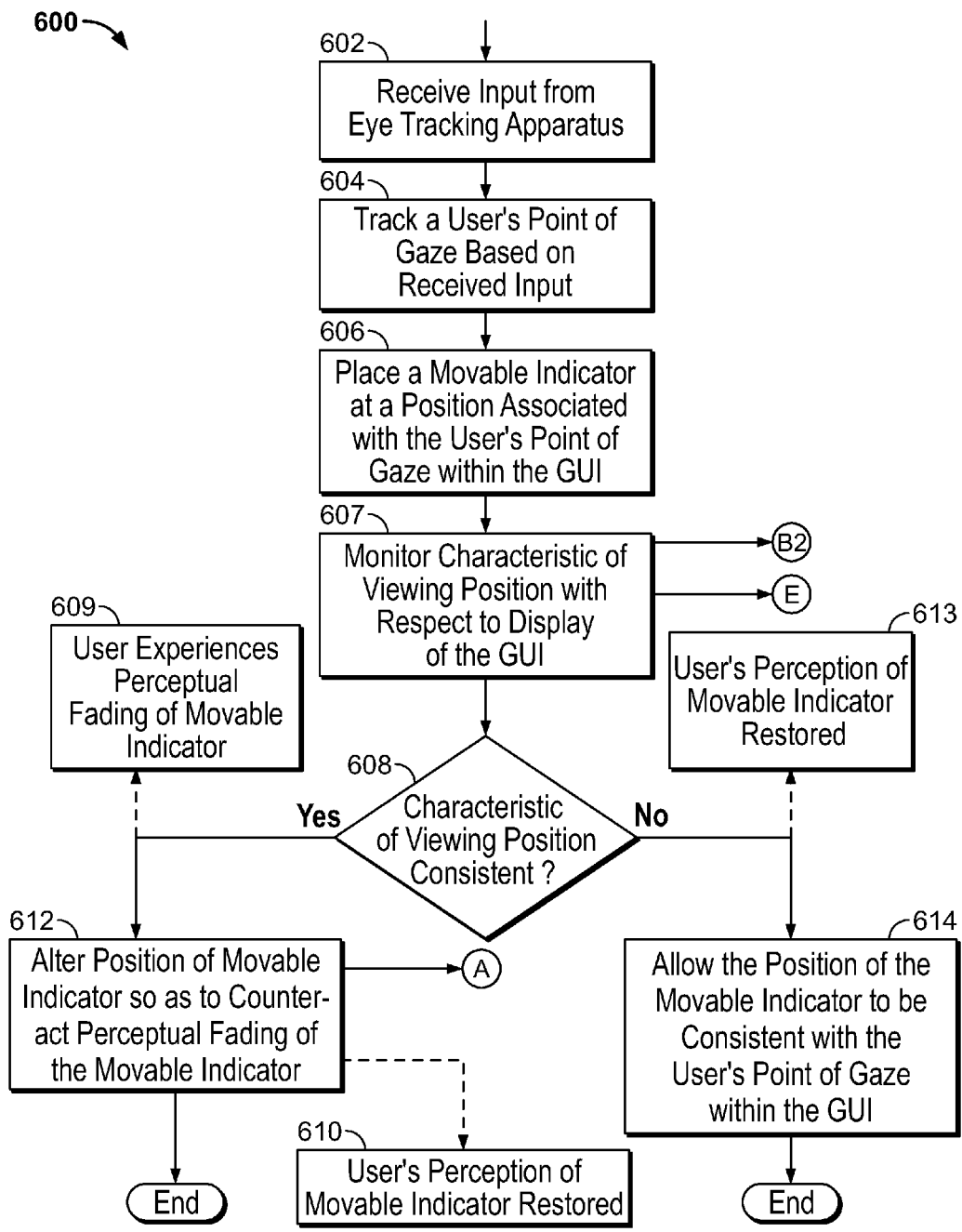
FIG. 6 is yet another flow diagram of a process for counteracting a perceptual fading of a movable indicator within a GUI presented by the eye tracking system.

FIG. 6 is yet another flow diagram of a process 600 for counteracting a perceptual fading of a movable indicator within a GUI presented by an eye tracking system. One or more of the steps of process 600 may implemented by an eye tracking system such as systems 100A and 200 of FIGS. 1A and 2A using, for example, one or more modules 132, 134, 136, 138 of FIG. 1C and modules 142, 144, 146, and 148 of FIG. 1D. Steps 602, 604, and 606 of process 600 may be substantively similar to steps 502, 504 and 506 of process 500.

At step 607, one or more characteristics of a user's viewing position with respect to a display of a GUI are monitored. These characteristics may include one or more of the distance between the user and the display of the GUI (such as, for example, the distance between the user's face and a display device rendering the GUI as discussed with respect to distance 212 in FIG. 2A), the user's viewing angle of the display of the GUI (such as, for example, the angle between an axis perpendicular to the surface of the display and a point on the user's face as discussed with respect to angle 225 of FIG. 2B), the orientation of the user's eyes with respect to the display of the GUI (such as, for example, a rotation in the orientation of the user's eyes with respect to the GUI caused by a tilt in the user's face), or any other suitable characteristic of the user's viewing position with respect to a display of the GUI. These characteristics may be calculated using data captured by one or more of components 110 or imaging components 208 by processor 102 or 118. The calculation of these characteristics will be further discussed with respect to FIGS. 8A and 8C.

In certain implementations, an initial measurement of the characteristic may be calculated. This initial measurement may take place during a predefined calibration period, such as when the user first uses, turns on, or begins interacting with the eye tracking system. Alternatively, this initial measurement may take place periodically throughout the user's interaction with the eye tracking system, such as every 10 seconds, one minute, 10 minutes, or any other suitable period of time. Subsequent measurements of the characteristic may then be calculated. These subsequent measurements may be calculated with any suitable frequency over a predetermined period of time after the initial measurement such that the eye tracking system can use the subsequent measurements to determine whether the characteristic has remained consistent over the period of time. For example, when the user opens a MacBook Air® laptop, imaging components built into the display of the laptop, such as an iSight camera, may be used to may make an initial calculation that the user's face is three feet from the display of the laptop. Subsequent calculations of the distance between the user's face and the display may be made over the following 10 second period, and it may be determined that the distance between the user's face and the display of the laptop ranged between 2.5 and 3.5 feet during this time. After the 10 second period, the process may repeat—i.e., another initial calculation of the distance may be made, and subsequent calculations may be made over the following 10 second period. Process 600 proceeds to step 608.

At step 608, it is determined whether the characteristic of the user's viewing position with respect to the display of the GUI is consistent. In certain implementations, this determination may be made using processor 102 or 118 by comparing an initial measurement of the characteristic to subsequent measurements of the characteristic calculated at step 607 to determine whether the subsequent measurements are within a predetermined range. Continuing the example discussed with respect to step 607, a predetermined range of ¼ of a foot may be set as a threshold for whether a user's viewing distance from the display of the GUI is consistent. Because the distance between the user's face and the display of the laptop varied more than this threshold from the initial measurement (i.e., ½ of a foot) during the 10 second period following the initial three foot measurement, it may be determined that the distance is inconsistent over the period of time. However, if a larger range is set as a threshold, such as ¾ of a foot, it may be determined that the distance is consistent over the period of time. If it is determined that the characteristic is consistent, process 500 may proceed to step 614. However, if it is determined Process 600 may then proceed to step 612.

When process 600 proceeds from step 608 to step 612, the movable indicator within the GUI may be a stabilized retinal image with respect to the user. This phenomenon may occur because the eye tracking apparatus is positioning the cursor wherever the user fixes their point of gaze at step 604, and the fact that the characteristic of the user's viewing position with respect to the display of the GUI has not recently changed. For example, a user may be working at a laptop computer for 15 seconds at a constant distance from the display, and eye tracking software running on the laptop computer may be constantly placing or rendering a cursor (or any other suitable movable indicator within the GUI) wherever the user fixes their point of gaze. As illustrated by feature 609, this tracking may cause a perceptual fading of the movable indicator with respect to the GUI. Accordingly, the eye tracking system may provide measures to counteract the perceptual fading of the movable indicator at step 612. These measures may include altering one or more of the position or the visual appearance of the movable indicator based on detecting a passage of time or a blinking of the user's eye as discussed with respect to steps 508 and 510 of FIG. 5. As a result of altering the position of the movable indicator, the movable indicator may no longer be a stabilized retinal image with respect to the user. Accordingly, as illustrated by feature 610, the user's perception of the movable indicator may be restored. Process 600 may then end.

When process 600 proceeds from step 608 to step 614, the movable indicator within the GUI may not be a stabilized retinal image with respect to the user. Because a characteristic of the user's viewing position with respect to the display of the GUI has not been consistent (i.e., has recently varied above a predetermined threshold), the user's perception of the display of the GUI has been refreshed. Accordingly, as illustrated by feature 613, the user's perception of the movable indicator may be restored.

At step 614, the position of the movable indicator may be allowed to be consistent with the user's point of gaze within the GUI. In certain implementations, the bitmap associated with the indicator may be rendered at a position around or adjacent to the position associated with the user's point of gaze. This position may be consistent in that the movable indicator is always rendered at the same position relative to the user's point of gaze when the user's point of gaze changes. In certain implementations, allowing the position of movable indicator to be consistent with the user's point of gaze may include suspending the detection of the passage of time or a blinking of the user's eye for a predetermined period of time. For example, view consistency module 146 may communicate an indication to blink tracking module 142 to stop the detection of user blinking for a predetermined period of time, communicate an indication to timer module 144 to suspend one or more timers for a predetermined period of time, and/or communicate an indication to indicator positioning module 148 to suspend altering the position or visual appearance of the movable indicator in the GUI for a predetermined period of time. As a result of these indications, GUI rendering module may position the cursor based on data received from input device module 132 via input device driver 134 rather than input from countermeasure generator 138. Once the predetermined period of time has lapsed, the eye tracking system may resume altering the position of the movable indicator based on detecting one or more of a passage of time or a blinking of the user's eyes. Process 600 may then end.

Figure 7:
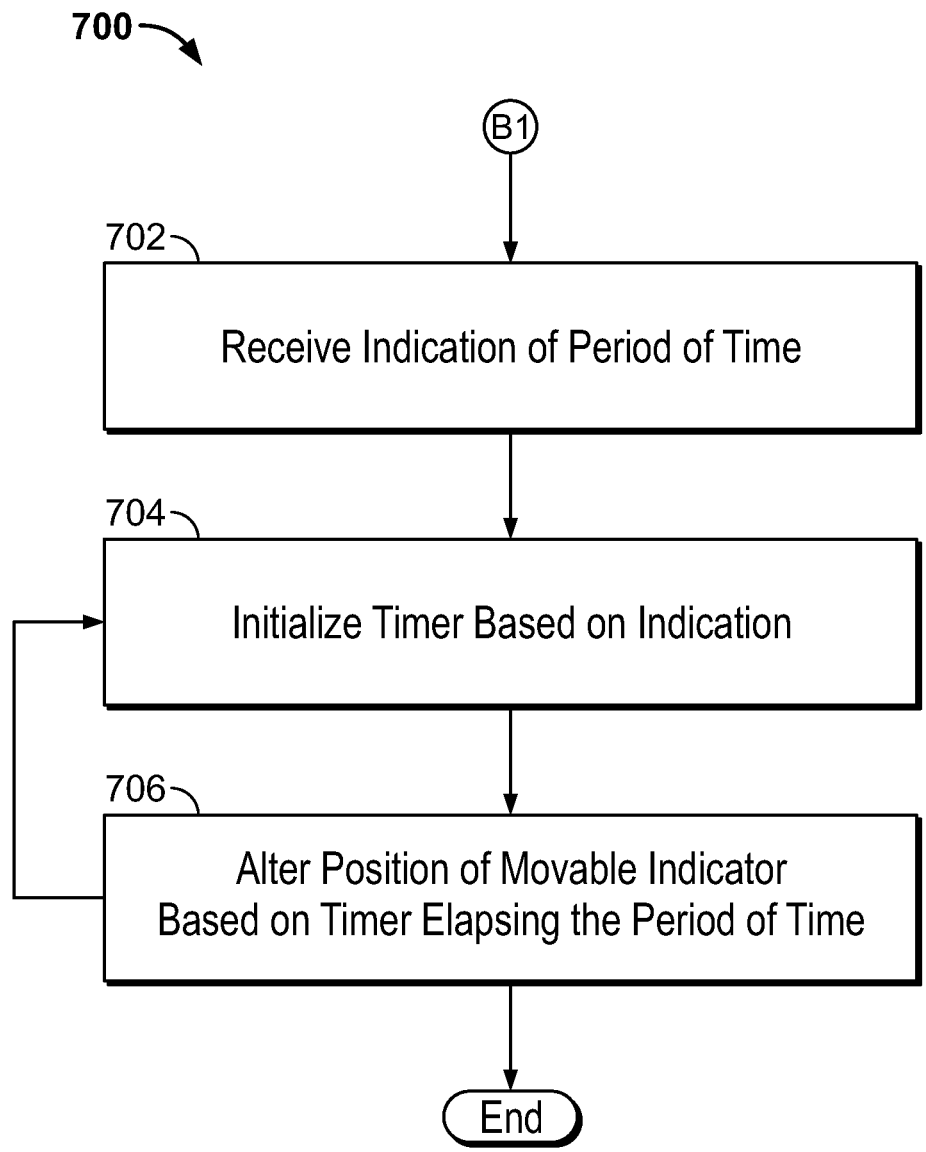
FIG. 7 a flow diagram for detecting the passage of time.

FIG. 7 a flow diagram of process 700 for detecting the passage of time by initializing one or more timers. One or more of the steps of process 700 may be implemented by an eye tracking system such as systems 100A and 200 of FIGS. 1A and 2A using, for example, timer module 144 of FIG. 1D. In certain implementations, process 700 may be executed as part of detecting a passage of time in step 508 of process 500. Detecting the passage of time at various intervals may allow the eye tracking system to periodically alter the position of a movable indicator that is tracked to the user's point of gaze such to counteract a perceptual fading of the movable indicator.

Process 700 may begin at step 702. At step 702, an indication of a period of time is received. In certain implementations, this period of time may indicate an interval at which the position of the movable indicator will be altered. This indication may be based on user input. For example, a user of the eye tracking system may be presented with an option to periodically alter the position of the movable indicator in order to counteract the perceptual fading of the movable indicator. The user may then specify a period of time using any suitable input, such as typing the period of time into a dialogue box or adjusting a slider bar to indicate a desired period of time. Alternatively, the indication of the period of time may be preset in the eye tracking system. This period of time may be any suitable amount, such as 100 milliseconds, 500 milliseconds, 1 second, or 5 seconds. In certain implementations, no indications of a period of time may be received at step 702. This lack of input may occur because the eye tracking system is configured to not alter the position of the movable indicator based on the passage of time. In such configurations, the eye tracking system may alter the position of the movable indicator based on the detection of other events, such as the blinking of a user's eyes. Process 700 proceeds to step 704.

At step 704, a timer may be initialized based on the indication of the period of time received at step 702. For example, if the indication of the period of time is 3 seconds, a timer may be set equal to 3 seconds. In certain implementations, as soon as the timer is initialized it may begin to run—i.e., count down from the amount of time to zero. When the timer reaches zero, process 700 may proceed to step 706.

At step 706, the position of the movable indicator in the GUI may be altered based on the timer elapsing the period of time. In other words, the position of the movable indicator may be altered when the timer reaches zero after counting down from the initialized amount of time. In certain embodiments, the position of the movable indicator may be altered to a position different from the position associated with the user's point of gaze. In one example, the GUI rendering module 136 may draw or render the movable indicator at a position within the GUI defined by one or more of data 400, such as one of the positions in boundary 408 or pattern 418. In another example, the GUI rendering module 136 may draw or render the movable indicator a predefined number of pixels in a predetermined direction from the position associated with the user's point of gaze, such as five pixels above the user's point of gaze or three pixels to the left of the user's point of gaze. In certain implementations, the movable indicator may be drawn or rendered back at the position associated with the user's point of gaze a short time after step 706 is executed because the user's point of gaze has remained constant. The temporary displacement of the cursor caused by step 706 may refresh the user's perception of the movable indicator, which counteracts the perceptual fading of the movable indicator with respect to the GUI. In certain implementations, process 700 may proceed to step 704, and reinitialize or reset the timer to the period of time. The timer may then elapse again, and step 706 may be repeated. Each time step 706 repeats, the position of the movable indicator may be altered to a different position, such as different randomly selected position in boundary 408 or the next position 406 of pattern 418 defined by data 400. Steps 704 and 706 may be repeated any suitable number of times. This repetition may stop or be suspended for a period of time when an indication to suspend a timer is received as discussed with respect to step 614 of process 600. Process 700 then ends.

Figure 8A:
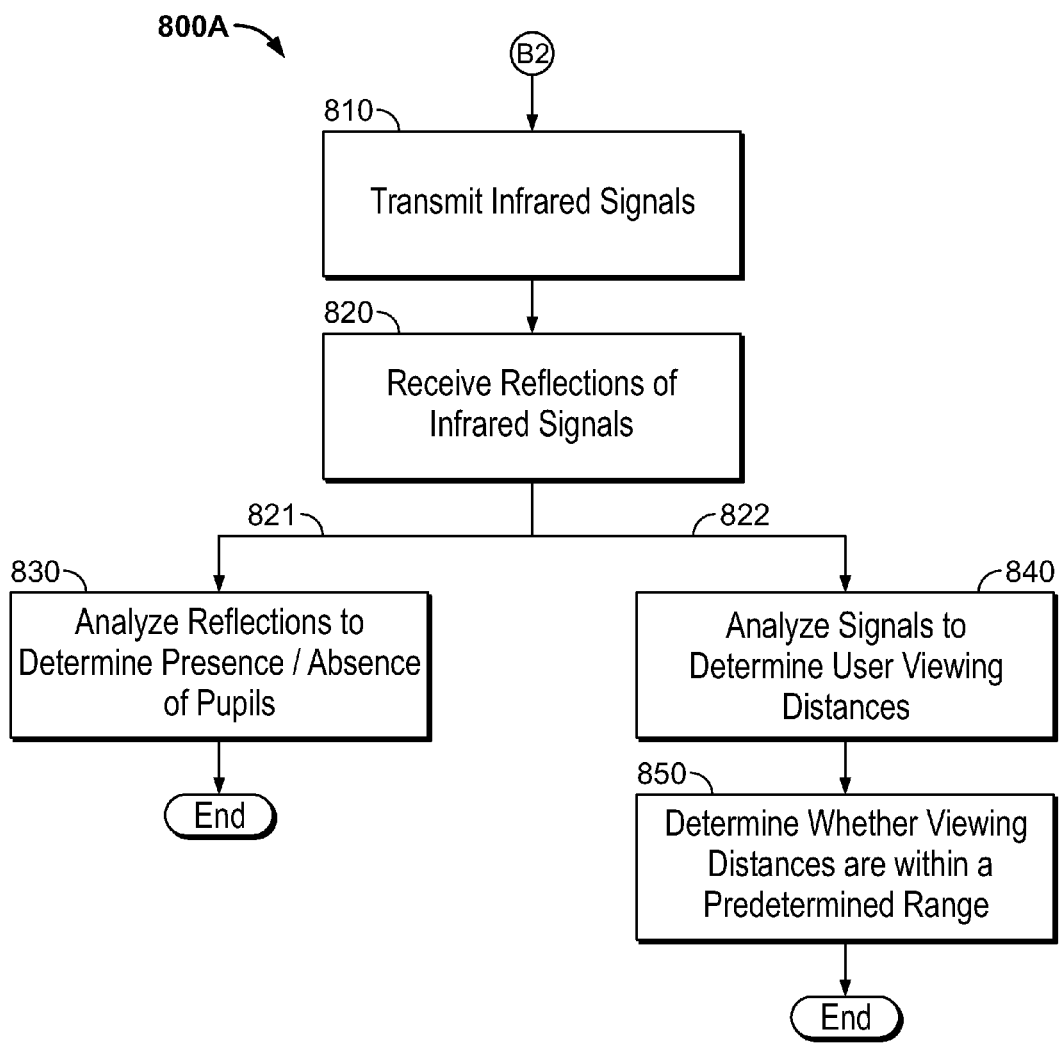
FIG. 8A is a flow diagram for detecting a blinking of the user's eye or determining a user's viewing distance from the display of the GUI.

FIG. 8A is a flow diagram of a process 800A for detecting a blinking of the user's eye or determining a user's viewing distance from the display of the GUI. One or more of the steps of process 800A may be implemented by eye tracking systems 100A and 200 of FIGS. 1A and 2A using, for example, one or more of components 110, processor 118, blink tracking module 142, and view consistency module 146. In certain implementations, process 800A may be executed as part of step 508 of process 500, step 607 of process 600, or both.

Process 800A begins at step 810. At step 810, infrared signals are transmitted from infrared transmitter 112. In certain configurations, the infrared transmitter may be mounted on or built into the display of the GUI itself, such as illustrated with imaging components 208 of display 202. The infrared signals may include one or more of infrared and near-infrared non-collimated light to create one or more images of reflections of pupils associated with a user's eyes, such as user eyes 220. The transmission of the infrared signals may occur at any suitable frequency such that data from the reflections of the infrared signals can be sampled at a rate sufficient for determining the presence of absence of a user's pupils, or a proximity of a user's eyes or face to the display of the GUI. Process 800A proceeds to step 820.

At step 820, reflections of the infrared signals are received by infrared receiver 114. In particular, one or more digital camera image sensors coupled to infrared filters or infrared receiver integrated circuits within infrared receiver 114 may receive the reflections of the infrared signals. In certain implementations, the infrared receiver may be housed in the display of the GUI itself, such as illustrated with imaging components 208 of display 202. The reception of the infrared signals may occur with any suitable frequency, and data associated with the received signals may be stored in data storage 120. The received signals may be converted to one or more digital images or sets of digital data for further processing. Process 800A then proceeds either to step 830 or 840 based on how the received signals are to be analyzed. If the received signals are to be analyzed to detect a blinking of the user's eyes, process 800A may follow branch 821 to step 830. If the received signals are to be analyzed to determine a viewing distance between the user and the display of the GUI, process 800A may follow branch 822 to step 840.

At step 830, the reflections of the infrared signals may be analyzed to determine a presence or absence of a user's exposed pupils. In certain implementations, the reflections of the received signals may be analyzed by processing one or more digital images constructed using the received signals. These digital images may be filtered using one or more of a physical infrared filter, software-based infrared filter, or both to create a digital image containing a reflection of infrared signals off of pupils of the user's eyes. A user's pupils may then be detected within the image using edge detection, thresholding, object recognition, or any suitable computer vision technique.

In certain implementations, a sequence of images may be analyzed at step 830 to detect a blinking of the user's eyes. In certain implementations, a blinking of the user's eyes may be detected if reflections of a user's pupils are present and subsequently absent in the sequence of images. For example, in a set of twenty consecutive images, both of the user's pupils may be detected as present in the first 15 images of the set, and absent in the last five images of the set. In this example, the transition between the fifteenth and sixteenth images may be determined to be a blinking of the user's eye. Alternatively, a blinking of a user's eyes may be detected if reflections of a user's pupils are present, subsequently absent, and subsequently present again. When a blinking of the user's eyes has been detected, the position of a movable indicator in the GUI may be altered to counteract a perceptual fading of the movable indicator. For example, blink tracking module 142 may send an indication of the blink to indicator positioning module 148, causing the position of the movable indicator to be altered as discussed with respect to step 510 of process 500 and the steps of process 900 (discussed below).

At step 840, the reflections of the infrared signals may be analyzed to determine viewing distances between a user and a display of the GUI. This distance may be the distance between the user's face and a display device rendering the GUI as discussed with respect to distance 212 in FIG. 2A. In certain implementations, the distances may be calculated by processing one or more digital images constructed using the received signals. For example, a sequence of digital images may be captured that each contain a reflection of infrared signals off of pupils of the user's eyes. The size of the user's pupils may then be detected in each of the images using edge detection, thresholding, object recognition, or any suitable computer vision technique. The relative size of the user's pupils may be compared between the images to estimate the user's viewing distance from the display. This estimation may be performed according to any suitable function. For example, it may be determined that the size of the user's pupil has decreased between two consecutive digital images by 25%. This percentage decrease may be translated to a 2 foot distance according to a predefined function. In certain implementations, the distances may be calculated by processing data obtained from an infrared receiver integrated circuit. For example, data obtained from the infrared receiver integrated circuit may represent an output voltage of the circuit. These output voltages may be translated to distances according to any suitable function. Process 800A proceeds to step 850.

At step 850, it is determined whether the viewing distances determined at step 840 are within a predetermined range. In certain implementations, this determination may be made by comparing an initial distance measurement to subsequent distance measurements using a threshold distance as described with respect to steps 607 and 608 of process 600. In other implementations, this determination may be made by comparing the distance measurements to two predefined distances. This determination may be made using user viewing distances gathered over any suitable window of time. When the distances are determined to be within the predetermined range over a particular period of time, the user viewing distance may be determined to be consistent over that period of time. This determination may cause the position of a movable indicator in the GUI to be altered so as to counteract a perceptual fading of the movable indicator as described with respect to step 612 of process 600. Otherwise, the user viewing distance may be determined to be inconsistent over the period of time, which may cause the position of the movable indicator to remain consistent with the user's point of gaze within the GUI as described with respect to step 614 of process 600. Process 800A may then end.

Figure 8B:
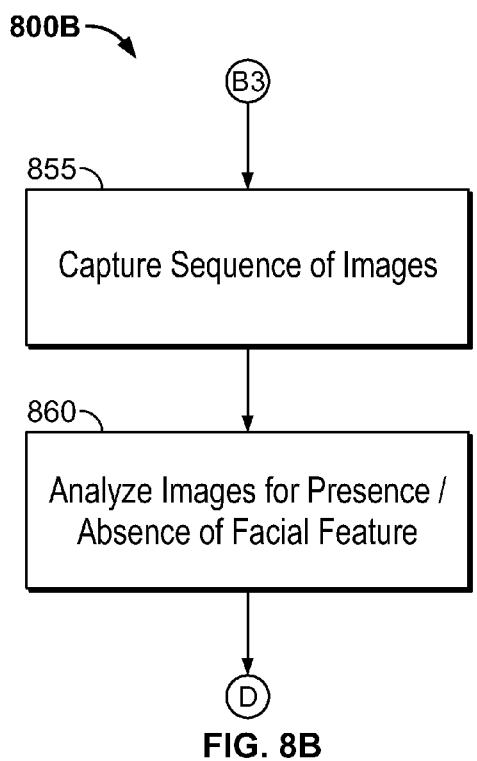
FIG. 8B is yet another flow diagram for detecting a blinking of the user's eye.

FIG. 8B is yet another flow diagram of a process 800B for detecting a blinking of the user's eye. One or more of the steps of process 800B may be implemented by eye tracking systems 100A and 200 of FIGS. 1A and 2A using, for example, one or more of components 110, processor 118, blink tracking module 142, and view consistency module 146. In certain implementations, process 800B may be executed as part of one or more of step 508 of process 500, and steps 607 and 608 of process 600.

Process 800B begins at step 855. At step 855, a sequence of images may be captured. In certain implementations, this sequence of images may be captured using camera 116. Camera 116 may be mounted on or built into the display of the GUI itself, such as illustrated with imaging components of display 202. The images may be captured at any suitable frequency in any suitable image format, and stored at data storage 120. Process 800B proceeds to step 860.

At step 860, the sequence of images may be analyzed to determine the presence or absence of a facial feature of a user of the eye tracking system. This facial feature may include one or more of a pupil, a pigment in the eye, an eyelid, or any facial feature indicating that a user's eyes are open or closed. In order to determine the presence or absence of a facial feature, one or more of edge detection, thresholding, object recognition, or any suitable computer vision technique may be used. In certain implementations, a blinking of the user's eyes may be detected if the facial feature is present and subsequently absent in the sequence of images. For example, in a set of twenty consecutive images, a pigment of the user's pupils may be detected as present in a particular region of the images in the first 10 images of the set, and absent in that region in the last 10 images in the set. In this example, the transition between the ninth and tenth images may be determined to be a blinking of the user's eye. Alternatively, a blinking of the user's eyes may be detected if a particular feature is present and subsequently replaced by another facial feature. For example, in a set of twenty consecutive images, shapes associated with two pupils may be detected in a particular region of the first 15 images of the set, and the shapes may be replaced by contours representing eyelids in the last five images of the set. In this example, the transition between the fifteenth and sixteenth images may be determined to be a blinking of the user's eyes. When a blinking of the user's eyes has been detected, the position of the movable indicator in the GUI may be altered to counteract a perceptual fading of the movable indicator. For example, blink tracking module 142 may send an indication of the blink to indicator positioning module 148, causing the position of the movable indicator to be altered as discussed with respect to step 510 of process 500 and the steps of process 900 (discussed below). Process 800B then ends.

Figure 8C:
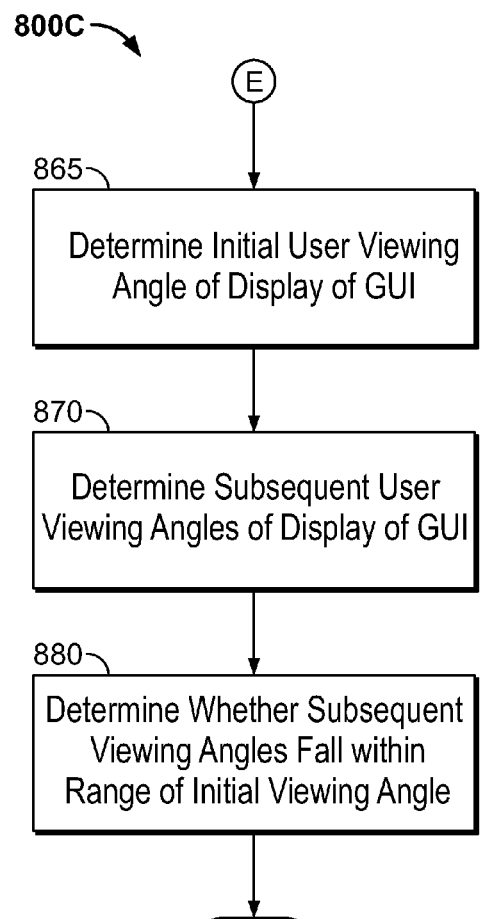
FIG. 8C is a flow diagram for determining a user's viewing angle of the display of the GUI.

FIG. 8C is a flow diagram of a process 800C for determining a user's viewing angle of the display of the GUI. One or more of the steps of process 800C may be implemented by eye tracking systems 100A and 200 of FIGS. 1A and 2A using, for example, one or more of components 110, processor 118, and view consistency module 146. In certain implementations, process 800B may be executed as part of one or more of steps 607 and 608 of process 600.

Process 800C begins at step 865. At step 865, an initial user viewing angle of the display of a GUI may be determined. This angle may be substantially similar to angle 225 discussed with respect to FIG. 2B. In certain implementations, the initial viewing angle may be determined based on an initial digital image of a user's face captured using, for example, camera 116. In certain implementations, camera 116 may be housed in the display of the GUI itself, such as illustrated with imaging components 208 of display 202. From this initial image, a midpoint between the eyes of the user may be defined using any suitable computer vision algorithm. This midpoint may be the basis of a first ray or axis that is defined between the midpoint and camera 116. An initial user viewing angle may be calculated between this first ray or axis and a second ray or axis defined parallel to the line of site of camera 116 (e.g., a ray or axis perpendicular to the point on the display of the GUI where camera 116 is located) using any suitable image transform. In certain implementations, this calculation may require determining a distance between the user's face and the display of the GUI. This distance may be calculated using on or more steps of process 800A described with respect to FIG. 8A. Process 800C may then proceed to step 870.

At step 870, additional or subsequent user viewing angles of the display of the GUI may be determined. In certain implementations, these subsequent user viewing angles may be determined using digital images captured subsequent to the initial digital image. The midpoint of the user's eyes and distance between the user's face and the display of the GUI may be determined in each of these images using any suitable computer vision technique, and the user viewing angle may be calculated based on these measures for each image. In certain implementations, the subsequent user viewing angles may be calculated for a predetermined period of time. This predetermined period of time may range from a few seconds to a few minutes. 800C then proceeds to step 880.

At step 880, it is determined whether the subsequent user viewing angles are within a range of the initial user viewing angle. This determination may indicate whether the user's view of the GUI is consistent. The range may be defined by a predetermined threshold. For example, an initial user viewing angle may be calculated as 23 degrees, and subsequent user viewing angles in the following 10 second period may range from 20 to 30 degrees. A predetermined range of five degrees may be set as a threshold for whether a user's viewing Because the user viewing angles measured during the 10 second period varied more than this threshold from the initial angle measurement (i.e., more than 28 degrees) it may be determined that the subsequent user viewing angles fall outside of the predetermined range. When the subsequent user viewing angles are determined to be within the range over a particular period of time, the user viewing angles may be determined to be consistent over that period of time. This determination may cause the position of a movable indicator in the GUI to be altered so as to counteract a perceptual fading of the movable indicator as described with respect to step 612 of process 600. Otherwise, the user viewing angles may be determined to be inconsistent over the period of time, which may cause the position of the movable indicator to remain consistent with the user's point of gaze within the GUI as described with respect to step 614 of process 600. Process 800C may then end.

Figure 9:
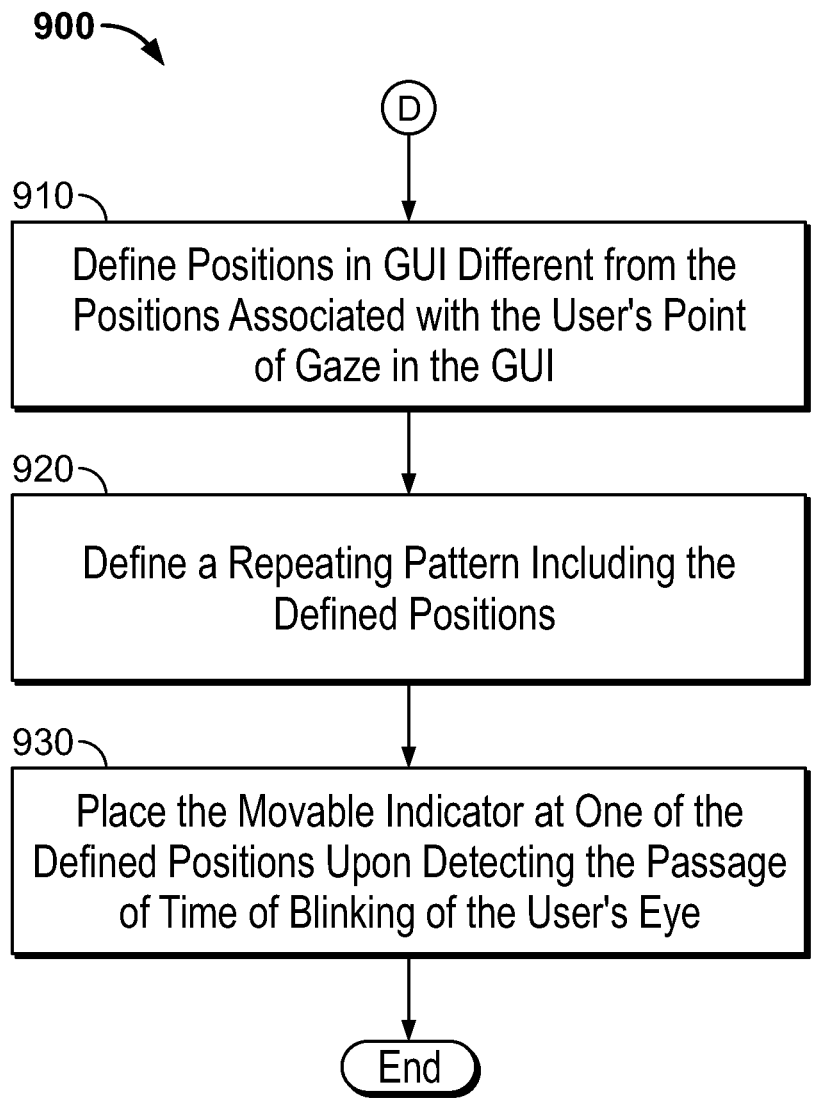
FIG. 9 is a flow diagram for defining positions at which to render the movable indicator within the GUI.

FIG. 9 is a flow diagram for a process 900 for defining positions at which to place or render the movable indicator within the GUI. One or more of the steps of process 900 may be implemented by an eye tracking system such as systems 100A and 200 of FIGS. 1A and 2A using, for example, processors 102 and 118, and indicator positioning module of FIG. 1D. In certain implementations, process 900 may be executed as part of altering the position the movable indicator at one or more of step 510 of process 500, step 612 of process 600, step 706 of process 700.

Process 900 begins at step 910. At step 910, positions in the GUI are defined that are different from the position associated with the user's point of gaze in the GUI. These positions may be associated with pixels within the GUI. In certain implementations, these positions may be defined similarly to defined positions 410, 412, 414, and 416 of data 400 discussed with respect to FIG. 4. The positions may be defined by setting a boundary around the position associated with the user's point of gaze within the GUI, and then selecting positions on or within the boundary according to the defined positions. In certain implementations, this boundary may be located a predefined number of pixels around the position associated with the user's point of gaze within the GUI, such as, for example, three, five, 10, or any suitable number of pixels around the GUI. In such implementations, the boundary may be uniform. In other implementations, this boundary may not be uniformly defined around the position associated with the user's point of gaze. For example, the boundary may be defined as a square shaped box with rounded corners as illustrated by boundary 305 in FIG. 3A. In certain implementations, the position associated with the user's point of gaze may be associated with a particular point on a bitmap of a movable indicator associated with the GUI. For example, the position associated with the user's point of gaze may be associated with the tip of a bitmap of a cursor representing the movable indicator, such, such as tip 301 of the bitmap representing cursor 302 illustrated in FIGS. 3A and 3B. In certain implementations, the defined positions may be selected randomly from positions in the GUI on or within the boundary, positions in the GUI outside of the boundary, or both. Process 900 then proceeds to step 920 or 930.

At step 920, a repeating pattern may be defined that includes one or more of the positions defined at step 920. This repeating pattern may be defined by selecting positions to populate a data structure with coordinates within a GUI in a defined order. This data structure may be similar to that discussed with respect to pattern 418 of data 400 in FIG. In certain implementations, the positions that are selected for the repeating pattern may form a geometric pattern. For example, the positions that are selected for the repeating pattern may be one or more equidistant positions along a boundary defined at step 910. In other implementations, the positions may be selected for the repeating pattern randomly. Process 920 then proceeds to step 930.

At step 930, the movable indicator may be placed or rendered at one of the defined positions upon detecting a passage of time of a blinking of the user's eyes. The passage of time may be detected by initializing one or more timers as discussed with respect to process 700 in FIG. 7. The blinking of the user's eyes may be detected as discussed with respect to process 800A of FIG. 8A, process 800B of FIG. 8B, or both. In certain implementations, the movable indicator may be placed or rendered at one of the defined positions by drawing or redrawing a bitmap associated with the movable indicator at one of the positions defined at step 910. In other implementations, the movable indicator may be placed or rendered at one of the defined positions by drawing or redrawing a bitmap associated with the movable indicator at one of the positions in the repeating pattern defined at step 920. Drawing or redrawing the cursor may be executed by GUI rendering module 136 as described with respect to FIG. 1C. In certain implementations, the movable indicator may be placed or rendered at a position different from the position associated with the user's point of gaze in the GUI each instance a passage of time or a blinking of the user's eyes is detected. The movable indicator may be placed or rendered at successive positions in the pattern defined at step 920 in a round robin fashion each instance a passage of time or a blinking of the user's eyes is detected. For example, if a pattern defined at step 920 includes three positions, the movable indicator may be placed or rendered at the first position, the second position, the third position, again at the first position, and so on each instance the passage of time or a blinking of the user's eyes is detected. Process 900 then ends.

It will be apparent to those of ordinary skill in the art that the systems and methods involved in the present application may be embodied in a computer program product that includes a computer usable, non-transitory, and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the implementations describe herein. Those skilled in the art will appreciate that aspects of the application can be practiced by other than the described implementations, which are presented for purposes of illustration rather than of limitation, and the aspects are limited only by the claims which follow.

What is claimed is:

1. A method comprising:
    tracking a point of gaze on a display of a graphical user interface (GUI) using an eye tracking apparatus;
    rendering a movable indicator at a gaze position associated with the point of gaze within the GUI;
    detecting that the point of gaze has been fixed at a region of interest for a specified amount of time that corresponds to an amount of time during which perceptual fading of the moveable indicator is estimated to have occurred; and
    in response to detecting that the point of gaze has been fixed at the region of interest for the specified amount of time, and while the point of gaze is still fixed at the region of interest, displaying continuous movement of the movable indicator from the gaze position to a new position within a predefined boundary that corresponds to a subregion of the user interface around the gaze position.

2. The method of claim 1, wherein a visual fixation on the movable indicator causes the movable indicator to be a stabilized retinal image with respect to a user, and wherein the perceptual fading of the movable indicator includes a perceived disappearance of the movable indicator.

3. The method of claim 1, wherein detecting that the point of gaze has been fixed at the region of interest for a specified amount of time further comprises:
    receiving an indication of a period of time;
    initializing a timer based on the indication; and
    altering a position of the movable indicator for each instance of the timer elapsing the period of time.

4. The method of claim 3, wherein the indication is generated based on user input; and wherein perceptual fading of the movable indicator causes the movable indicator perceptively to disappear.

5. The method of claim 1, wherein displaying continuous movement of the movable indicator further comprises:
    defining one or more positions in the GUI different from a last detected position of the point of gaze within the GUI; and
    rendering the movable indicator at one or more of the one or more defined positions.

6. The method of claim 5, wherein defining the one or more positions within the GUI comprises:
    setting the boundary a predefined amount of pixels around the last detected position of the point of gaze within the GUI; and
    defining the one or more positions as one or more pixels on the boundary.

7. The method of claim 6, wherein the one or more pixels on the boundary are selected randomly; and wherein the displaying includes restoring the perception of the movable indicator.

8. The method of claim 6, wherein the one or more pixels on the boundary are selected based on a predetermined pattern.

9. The method of claim 5, further comprising:
    defining a repeating pattern comprising multiple defined positions that are a specified distance around the last detected position of the point of gaze within the GUI; and
    rendering the movable indicator at a different one of the multiple defined positions in the repeating pattern upon each instance of detecting the passage of the amount of time.

10. The method of claim 1, further comprising:
transmitting infrared signals from an infrared transmitter on the display of the GUI;
receiving reflections of the infrared signals at a camera associated with the eye tracking apparatus; and
analyzing the reflections of the infrared signals for a presence and subsequent absence of an exposed pupil.

11. The method of claim 1, further comprising:
capturing a sequence of images of a face using a camera associated with the eye tracking apparatus; and
analyzing the sequence of images for a presence and subsequent absence of at least one facial feature.

12. The method of claim 11, wherein the at least one facial feature comprises one of a pupil, a pigment in the eye, or an eyelid.

13. The method of claim 1, wherein displaying continuous movement of the movable indicator further comprises rendering the movable indicator at a different position as the point of gaze remains at the last detected position; and wherein the continuous movement of the movable object is performed independently of the movement of the point of gaze responsive to input from the eye tracking apparatus.

14. The method of claim 1, wherein displaying continuous movement of the movable indicator further comprises transmitting data to an input device driver that prompts the GUI to render the movable indicator at a different position in the GUI.

15. A system comprising:
a display device arranged to render the display of a graphical user interface (GUI);
imaging components arranged to track a point of gaze on the display device; and
a processor arranged to:
render a movable indicator at a gaze position associated with the point of gaze;
detect that the point of gaze has been fixed at a region of interest for a specified amount of time that corresponds to an amount of time during which perceptual fading of the moveable indicator is estimated to have occurred; and
in response to detecting that the point of gaze has been fixed at the region of interest for the specified amount of time, and while the point of gaze is still fixed at the region of interest, display continuous movement of the movable indicator from the gaze position to a new position within a predefined boundary that corresponds to a subregion of the user interface around the gaze position.

16. The system of claim 15, wherein a visual fixation on the movable indicator causes the movable indicator to be a stabilized retinal image, and wherein the perceptual fading of the movable indicator includes a perceived disappearance of the movable indicator.

17. The system of claim 15, wherein the processor is arranged to:
receive an indication of a period of time;
initialize a timer based on the indication; and
alter a position of the movable indicator for each instance of the timer elapsing the period of time.

18. The system of claim 17, wherein the indication is generated based on user input.

19. The system of claim 15, wherein the processor is arranged to:
define one or more positions in the GUI different from a last detected position of the point of gaze within the GUI; and
render the movable indicator at one or more of the one or more defined positions.

20. The system of claim 19, wherein the processor is arranged to define the one or more positions within the GUI by:
setting the boundary a predefined amount of pixels around the last detected position of the point of gaze within the GUI; and
defining the one or more positions as one or more pixels on the boundary.

21. The system of claim 20, wherein the processor is arranged to select the one or more pixels on the boundary randomly.

22. The system of claim 20, wherein the processor is arranged to select the one or more pixels on the boundary based on a predetermined pattern.

23. The system of claim 19, wherein the processor is further arranged to:
define a repeating pattern comprising multiple defined positions that are a specified distance around the last detected position of the point of gaze within the GUI; and
render the movable indicator at a different one of the multiple defined positions in the repeating pattern upon each instance of detecting the passage of the amount of time.

24. The system of claim 15, comprising:
an infrared transmitter built into the display device that is arranged to transmit infrared signals outward from the display device;
an infrared receiver arranged to receive reflections of the infrared signals; and
wherein the processor is arranged to analyze the reflections of the infrared signals for a presence and subsequent absence of an exposed pupil.

25. The system of claim 15, comprising:
imaging components arranged to capture a sequence of images of a face; and
wherein the processor is arranged to analyze the sequence of images for a presence and subsequent absence of at least one facial feature.

26. The system of claim 25, wherein the at least one facial feature comprises one of a pupil, a pigment in the eye, or an eyelid.

27. The system of claim 25, wherein the processor is arranged to display continuous movement of the movable indicator by rendering the movable indicator at a different position as the point of gaze remains at the last detected position; and wherein the continuous movement of the movable object is performed independently of the movement of the point of gaze responsive to input from the eye tracking apparatus.

28. The system of claim 25, wherein the processor is arranged to display continuous movement of the movable indicator by transmitting data to an input device driver that prompts the GUI to render the movable indicator at a different position in the GUI.

* * * * *